(12) United States Patent
Maekawa et al.

(10) Patent No.: US 6,731,624 B1
(45) Date of Patent: May 4, 2004

(54) SYNC SIGNAL DETECTION METHOD AND RADIO COMMUNICATION SYSTEM

(75) Inventors: Takuji Maekawa, Kanagawa (JP); Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/516,520

(22) Filed: Mar. 1, 2000

(30) Foreign Application Priority Data

Mar. 1, 1999 (JP) .......................................... P11-053251

(51) Int. Cl.[7] .................................................. H04J 3/06
(52) U.S. Cl. ......................... 370/350; 370/509; 375/368
(58) Field of Search ................................ 370/216, 350, 370/347, 338, 328, 503, 504, 509, 512, 708; 714/775, 776, 798; 375/226, 330, 343, 360, 368, 367, 371, 373; 340/825.2

(56) References Cited

U.S. PATENT DOCUMENTS

| | | | | | |
|---|---|---|---|---|---|
| 4,620,300 A | * | 10/1986 | Ogawa | .......................... | 369/33 |
| 5,517,513 A | * | 5/1996 | Lee | .............................. | 371/47.1 |
| 5,677,935 A | * | 10/1997 | Karino | ......................... | 375/368 |
| 5,802,039 A | * | 9/1998 | Obayashi et al. | ........... | 370/216 |
| 6,069,855 A | * | 5/2000 | Fuma et al. | ................... | 369/47 |

* cited by examiner

Primary Examiner—Duc Ho
(74) Attorney, Agent, or Firm—Jay H. Maioli

(57) ABSTRACT

A sync signal detection method for receiving a sync signal regularly radio-transmitted from a predetermined station at a predetermined cycle and detecting the received sync signal is used in which a cycle at which a sync signal is detected is judged, a detection window having a predetermined width is set at every judged cycle, and only a sync signal detected from received signals in the detection window is judged as an effective sync signal.

6 Claims, 15 Drawing Sheets

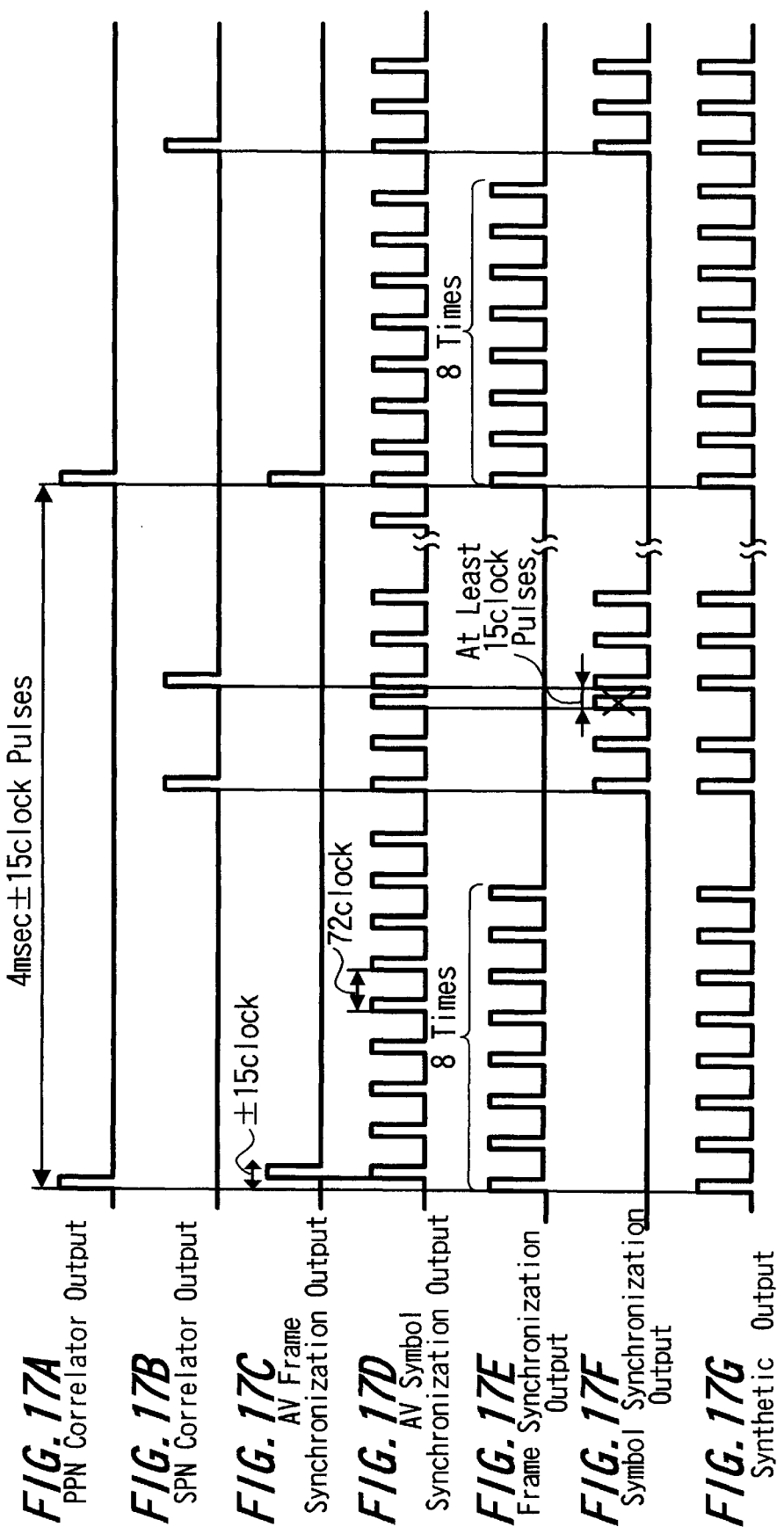

SYNC SIGNAL DETECTION METHOD AND RADIO COMMUNICATION SYSTEM

BACKGROUND OF THE INVENTION

1. Field of the Invention

The present invention relates a sync signal detection method preferably used for a communication system of a radio LAN which connects a plurality of terminals through radio and a radio communication system to the sync signal detection method.

2. Description of the Related Art

Because a data processor system such as a computer system is advanced in function, it is frequently performed to share a file or data by connecting a plurality of computer systems and thereby constituting a LAN (Local Area Network) or transfer electronic mails and various types of data. A conventional LAN connects computer systems each other by using a coaxial cable or twisted pair cable.

However, because the LAN using a cable requires wiring operations, it is difficult to easily constitute the LAN and a cable for connecting computer systems to each other is an obstacle. Therefore, a radio LAN is noticed as a system for releasing a user from wiring of a conventional LAN according to a cable system.

In this case, the data transmitted between computer systems is data having a comparatively high transmission rate. Therefore, it is proposed to transmit data through a high-efficiency transmission system such as OFDM (Orthogonal Frequency Division Multiplex) system or CDMA (Code Division Multiple Access) system.

Specifically, because use of information as multimedia has been recently accelerated, data including a large amount of content such as image data or audio data has been frequently used. Therefore, it is also requested for a radio LAN to improve a transmission rate so that data including a large amount of content such as image data or audio data can be transmitted and it is proposed to use the above-described high-efficiency transmission system.

However, when increasing a transmission rate, it is necessary for a terminal for receiving transmitted data to securely perform sync acquisition processing in order to correctly perform demodulation in the terminal.

A sync signal for sync acquisition is added to transmitted data and demodulation is executed at the reception side on the basis of the timing when detecting the sync signal. Therefore, when a reception-side terminal fails in acquisition of the sync signal, it is impossible to receive and demodulate the transmitted data before the next sync signal is acquired. When the above trouble occurs, a request for retransmission of data is necessary and a prepared transmission band is wastefully used and a network using efficiency is deteriorated.

SUMMARY OF THE INVENTION

In view of the above, the object of the present invention is to make it possible that when performing that kind of radio communications setting of sync timing can be preferably performed by detecting a transmitted sync signal.

A sync signal detection method of the present invention uses a sync signal detection method for receiving a sync signal regularly radio-transmitted from a predetermined station at a predetermined cycle and detecting the received sync signal, comprising the steps of judging a cycle at which a sync signal is detected, setting a detection window having a predetermined width every judged cycle, and judging only a sync signal detected from received signals in the detection window as an effective sync signal.

According to the sync signal detection method, it is possible to perform sync processing by using a cyclically-set detection window and thereby using only a sync signal transmitted in a certain range and minimize a sync-timing delay at the side for receiving a sync signal even if the timing for transmitting a sync signal is comparatively greatly delayed due to relay processing.

Moreover, a radio communication system of the present invention comprises reception means for receiving a radio signal, sync detection means for detecting a predetermined sync signal out of radio signals received by the reception means, cycle judgment means for judging a cycle at which a sync signal is detected by the sync detection means, and sync control means for setting a sync detection window at a cycle judged by the cycle judgement means and judging only a sync signal detected by the sync detection means in a range in which the window is set as an effective sync signal.

According to the radio communication system, only a sync signal detected by the sync detection means in a sync detection window set by the sync control means is judged as a correct-timing sync signal and sync processing is performed by using only the sync signal judged as the correct-timing sync signal.

BRIEF DESCRIPTION OF THE DRAWINGS

FIG. 17 is a timing diagram showing an output pulse by an embodiment of the present invention.

DETAILED DESCRIPTION OF THE PREFERRED EMBODIMENT

An embodiment of the present invention is described below by referring to the accompanying drawings.

Figure 1:
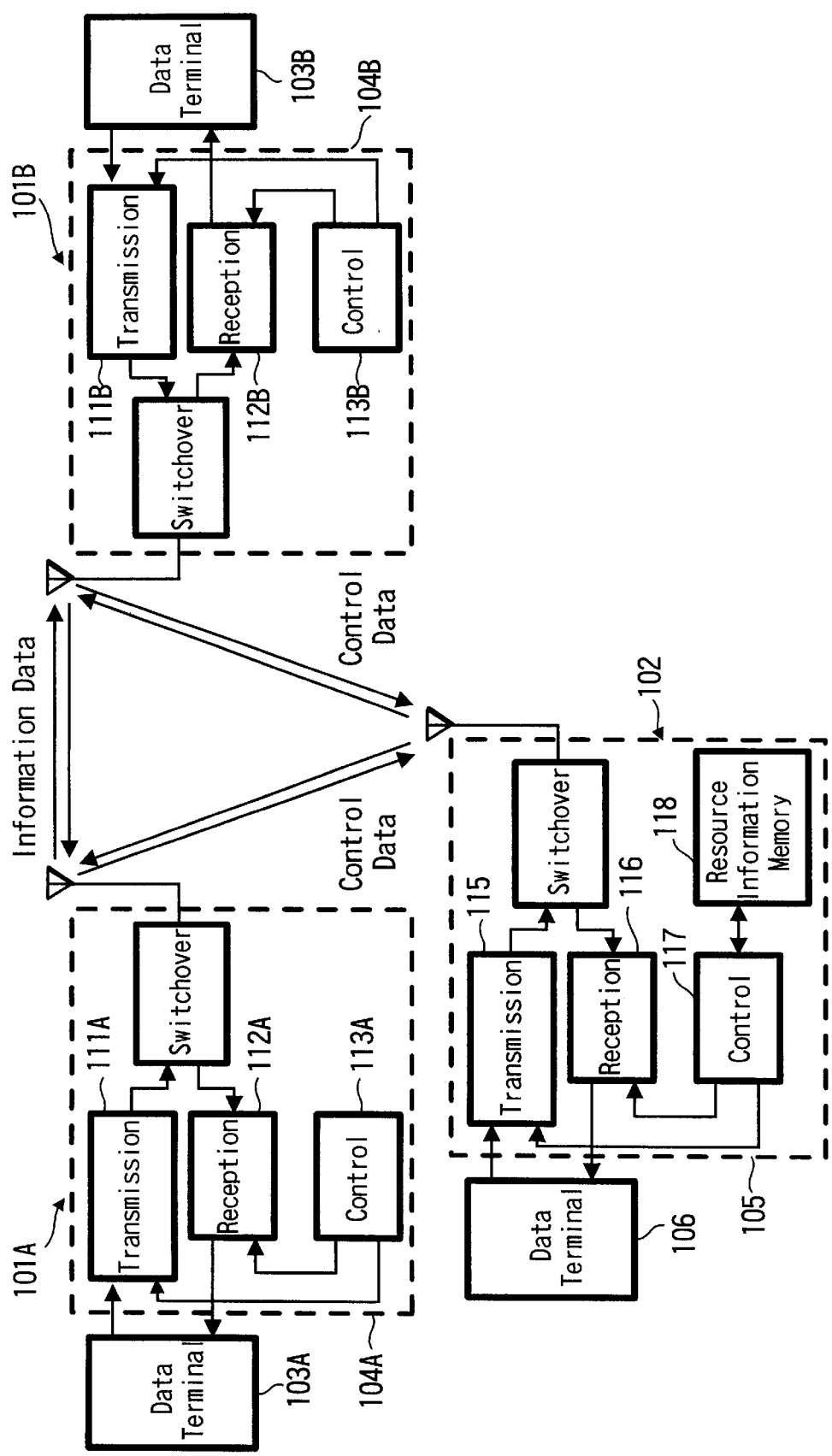
FIG. 1 is a block diagram showing an example of configuration of a radio LAN system to which an embodiment of the present invention is applied.

FIG. 1 shows the outline of radio LAN system to which the present invention is applied. The radio LAN system to which the present invention is applied comprises a plurality of radio communication terminals 101A, 101B, . . . and a radio communication control terminal 102. The radio communication terminals 101A, 101B, . . . are constituted by connecting radio communication units 104A, 104B, . . . to computer data terminals 103A, 103B, . . . The radio communication terminals 102 is constituted by connecting radio communication unit 105 to computer data terminal 106. Data communication is performed between the radio communication terminals 101A, 101B, . . . and data communication between the radio communication terminals 101A, 101B, . . . is controlled by the radio communication control terminal 102. The radio communication control terminal 102 can be also constituted of only a radio communication unit 105. Moreover, it is permitted that the radio communication control terminal 102 is constituted in common with other radio communication terminals 101A, 101B, . . . and only the terminal 102 set as a control terminal executes a control function.

The radio communication units 104A, 104B, . . . close to the radio communication terminals 101A, 101B, . . . comprise control sections 113A, 113B, . . . Transmission sections 111A, 111B, . . . are constituted so as to be able to perform radio data communication in accordance with the OFDM (Orthogonal Frequency Division Multiplex) system.

The radio communication unit 105 close to the radio communication control terminal 102 comprises a transmission section 115, a reception section 116, and a control section 117. The transmission section 115 and reception section 116 are constituted so as to be able to perform radio data communication in accordance with the OFDM system. Moreover, the radio communication unit 105 close to the radio communication control terminal 102 is provided with a resource information storage section 118 for storing the resource information about the assignment time of data communication of a radio communication terminal.

In the case of this system, data communication is performed in accordance with the OFDM system. Moreover, when assuming 147455 symbols (corresponding to 4 msec in this case) of OFDM as one frame, data is transmitted in accordance with time division multiplex.

A sync-acquiring M-sequence code (PN code) is transmitted to the head of one frame from the radio communication unit 105 of the radio communication control terminal 102. The sync-acquiring M-sequence code is received by the radio communication units 104A, 104B, . . . of the radio communication terminals 101A, 101B, . . . , a frame cycle is judged by using the reception timing as a reference timing, and the timing for transmitting or receiving data is set.

When communication of asynchronous data is requested from the radio communication terminals 101A, 101B, . . . , a transmission request is sent to the radio communication unit 105 of the radio communication control terminal 102 from the radio communication units 104A, 104B, . . . of the radio communication terminals 101A, 101B, . . . The radio communication unit 105 of the radio communication control terminal 102 determines the transmission assignment time of each of the radio communication terminals 101A, 101B, . . . in accordance with the transmission request and resource information and transmits control information including the transmission assignment time to the radio communication units 104A, 104B, . . . of the radio communication terminals 101A, 101B, . . . from the radio communication unit 105 of the radio communication control terminal 102. The radio communication units 104A and 104B of the radio communication terminals 101A and 101B transmits or receives data in accordance with the transmission assignment time. In this case, data is transmitted or received in accordance with a sync signal constituted of cycle-acquiring M-sequence data sent to the head of one frame.

Figure 2:
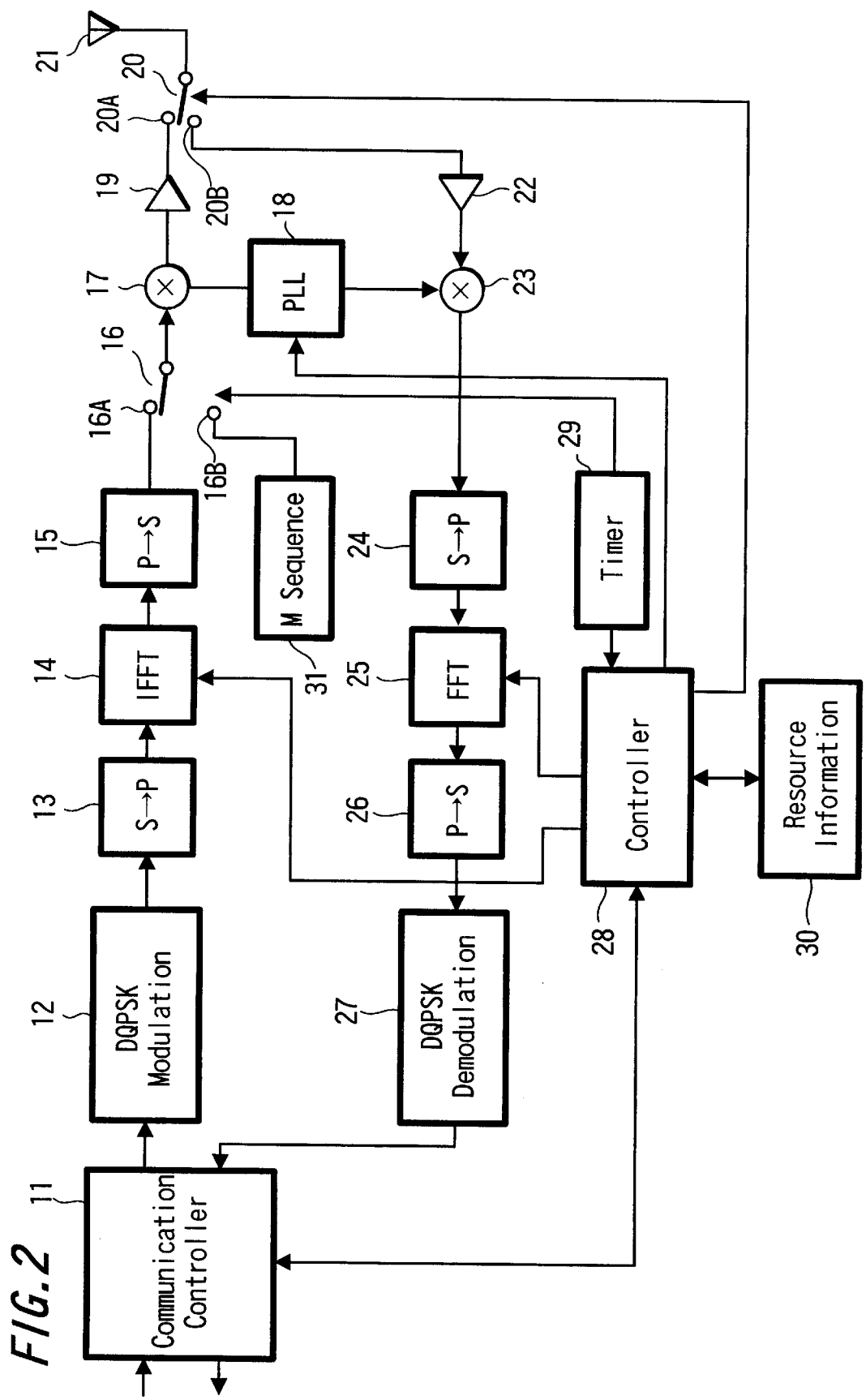
FIG. 2 is a block diagram of a radio communication unit of a radio communication control terminal in a radio LAN system to which an embodiment of the present invention is applied.

FIG. 2 shows a configuration of the radio communication unit 105 close to the radio communication control terminal 102. In FIG. 2, symbol 11 denotes a communication controller and data is transferred to and from a data terminal through the communication controller 11.

Data transmitted from the communication controller 11 is supplied to a DQPSK (Differentially Encoded Quadrature Phase Shift Keying) modulation circuit 12. The transmitted data is modulated by the DQPSK modulation circuit 12 in accordance with DQPSK.

An output of the DQPSK modulation circuit 12 is supplied to a serial/parallel conversion circuit 13. Serial data is converted to parallel data by the serial/parallel conversion circuit 13. An output of the serial/parallel conversion circuit 13 is supplied to an IFFT (Inverse Fast Fourier Transform) circuit 14. Transmitted data is mapped to frequency-area data and inverse-Fourier-transformed and converted to time-area data. An output of the IFFT circuit 14 is supplied to a parallel/serial conversion circuit 15.

The serial/parallel conversion 13, IFFT circuit 14, and parallel/serial conversion circuit 15 convert a signal to a multi-carrier signal in accordance with the OFDM system. The OFDM system is constituted so that a high bit rate can be obtained as a whole by assuming a frequency interval as $f_0$, using a plurality of subcarriers obtained by perpendicularly intersecting subcarriers so that interference between codes does not occur and thereby assigning a low-bit-rate signal to each subcarrier.

Figure 3:
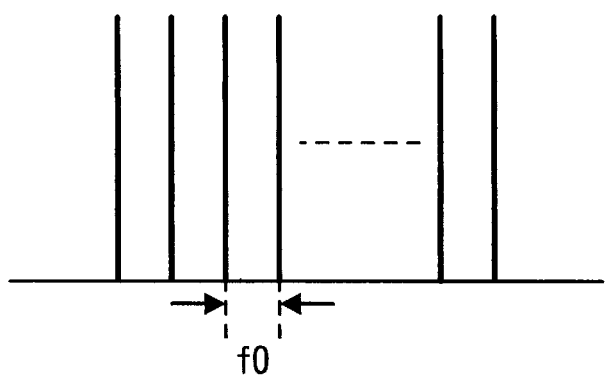
FIG. 3 is a spectrum diagram used to explain an OFDM system.

FIG. 3 shows a spectrum of a transmission waveform according to the OFDM system. As shown in FIG. 3, in the case of the OFDM system, a signal is transmitted by using subcarriers orthogonal to each other at a frequency interval $f_0$.

In the case of OFDM, signal generation is performed by mapping a transmitted signal to a frequency area and converting the signal from the frequency area to a time area. Demodulation is performed by capturing a waveform received every interval $f_0$ and converting a time-area signal to a frequency-area signal through FFT (Fast Fourier Transform).

Figure 4:
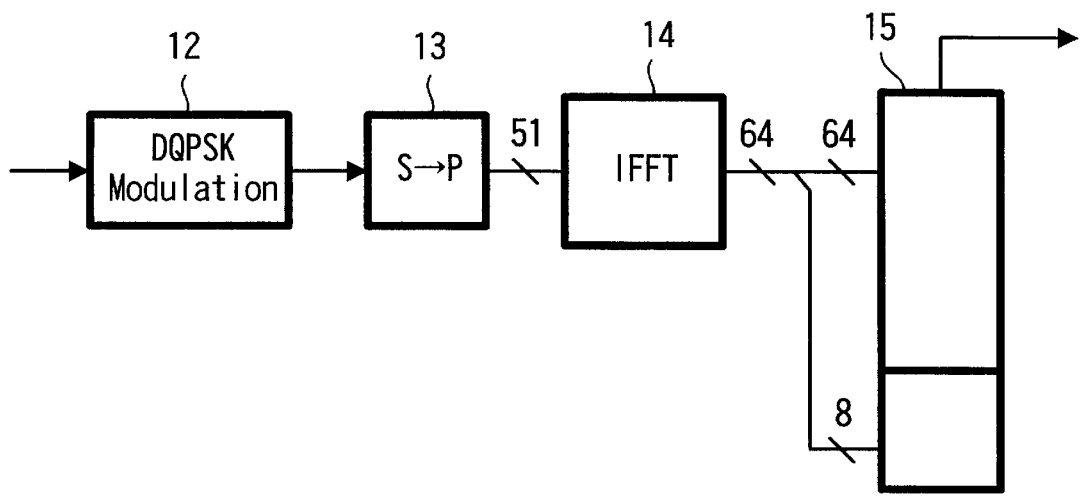
FIG. 4 is a block diagram used to explain OFDM modulation in a radio LAN system to which an embodiment of the present invention is applied.
Figure 5:
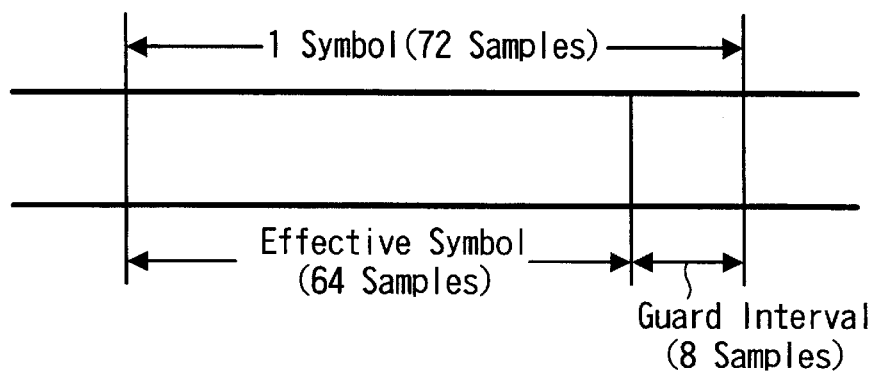
FIG. 5 is an explanatory illustration of OFDM modulation in a radio LAN system to which an embodiment of the present invention is applied.

In the case of this example, as shown in FIG. 4, 51 samples of outputs of the DQPSK conversion circuit 12 are converted to parallel data by the serial/parallel conversion circuit 13 and mapped to a frequency area. Outputs of the serial/parallel conversion circuit 13 are converted to time-area data by the IFFT circuit 14 and an effective symbol of 64 samples is output from the IFFT circuit 14. A guard interval of 8 symbols is added to the effective symbol of 64 samples.

Therefore, in the case of this example, one symbol comprises an effective symbol of 64 samples and 72 samples of 8-sample guard interval.

Because the OFDM system transmits data by dispersing the data to a plurality of subcarriers, the time for one symbol increases. Moreover, because a guard interval is set in accordance with time base, the OFDM system does not easily receive an influence on jitter or an influence on a multipath. A guard interval is selected so as to be equal to about 10 to 20% of an effective symbol length.

That is, in the case of the OFDM system, it is necessary to cut an effective symbol length out of consecutive received signals when performing FFT under demodulation and perform FFT. Even if there is an error when cutting out an effective symbol due to jitter or the like, frequency components are not changed because a guard interval is present and only a phase error occurs. Therefore, demodulation is realized by inserting a known pattern into a signal to perform phase compensation or using differential encoding to undo a phase difference. In the case of only normal QPSK modulation, it is necessary to adjust timing to each bit. In the case of the OFDM system, however, demodulation is possible because sensitivity is deteriorated by only several dB even if timing is shifted by several bits.

In FIG. 2, an output of the parallel/serial conversion circuit 15 is supplied to a terminal 16A of a switched circuit 16. An output of an M-sequence (Maximum Length Code) generation circuit 31 is supplied to a terminal 16B of the switched circuit 16.

An output of the switched circuit 16 is supplied to a frequency conversion circuit 17. A local oscillation signal is supplied to the frequency conversion circuit 17 from a PLL synthesizer 18. A transmitted signal is converted to a predetermined frequency by the frequency conversion circuit 17. It is considered to use for example, 2.4, 5.7, or 19 GHz band in a quasi-microwave band as a transmission frequency.

An output of the frequency conversion circuit 17 is supplied to a power amplifier 19. A transmitted signal is power-amplified by the power amplifier 19. An output of the power amplifier 19 is supplied to a terminal 20A of a switched circuit 20. The switched circuit 20 is switched under transmission and reception. When data is transmitted, the switched circuit 20 is switched to terminal-20A side. An output of the switched circuit 20 is supplied to an antenna 21.

A signal received from the antenna 21 is supplied to the switched circuit 20. The switched circuit 20 is switched to terminal-20B side when data is received. An output of the switched circuit 20 is amplified through an LNA (Low Noise Amplifier) 22 and then, supplied to a frequency conversion circuit 23.

A local oscillation signal is supplied to the frequency conversion circuit 23 from a PLL synthesizer 18. A received signal is converted to an intermediate-frequency signal by the frequency conversion circuit 23.

An output of the frequency conversion circuit 23 is supplied to a serial/parallel conversion circuit 24. An output of the serial/parallel conversion circuit 24 is supplied to an FFT circuit 25. An output of the FFT circuit 25 is supplied to a parallel/serial conversion circuit 26.

The serial/parallel conversion circuit 24, FFT circuit 25, and parallel/serial conversion circuit 26 perform OFDM-type demodulation. That is, effective data is cut out by the serial/parallel conversion circuit 24, a received waveform is captured every interval $f_0$, and converted to parallel data. An output of the serial/parallel conversion circuit 24 is supplied to the FFT circuit 25 and a time-area signal is converted to a time-area signal by the FFT circuit 25. Thus, OFDM-type modulation is performed by applying FFT to a waveform sampled every interval $f_0$.

An output of the parallel/serial conversion circuit 26 is supplied to a DQPSK demodulation circuit 27. The DQPSK demodulation circuit 27 performs DQPSK-type demodulation. An output of the DQPSK demodulation circuit 27 is supplied to a communication controller 11. Received data is output from an output of the communication controller 11.

The whole operation is controlled by a controller 28. Transmission or reception of data is controlled by the communication controller 11 in accordance with a command output from the controller 28.

This system transmits data in accordance with the TDMA system and transmits a M-sequence code for cycle acquisition to one symbol at the head of one frame. To realize the above control, the M-sequence generation circuit 31, a resource information memory 30, and a timer 29 are provided for the radio communication unit 105 of the radio communication control terminal 102. The switched circuit 16 is switched to terminal-16B side at the timing of a symbol at the head of one frame. Thereby, an M-sequence of one symbol is transmitted at the timing of the frame head.

When a transmission request for an asynchronous transfer packet or the like is sent from the radio communication units 104A, 104B, . . . of the radio communication terminals 101A, 101B, . . . , the transmission request is received by the antenna 21, OFDM-type demodulation is applied to the request by the FFT circuit 25, DQPSK-type demodulation is applied to the request by the DQPSK demodulation circuit 27, and the request is supplied to the communication controller 11. Then, demodulated received data is sent to the controller 28 from the communication controller 11.

The controller 28 is provided with the resource information memory 30. The resource information memory 30 stores the resource information about assignment times of radio communication terminals 101A, 101B, . . . sent as one frame. The controller 28 determines a transmission assignment time of each of the radio communication terminals 101A, 101B, . . . The control information for transmission assignment is sent to the communication controller 11 from the controller 28. Then, the data output from the communication controller 11 is DQPSK-modulated by the DQPSK modulation circuit 12, OFDM-converted by the IFFT circuit 14, and sent to the radio communication units 104A and 104B of the radio communication terminals 101A and 101B.

Figure 6:
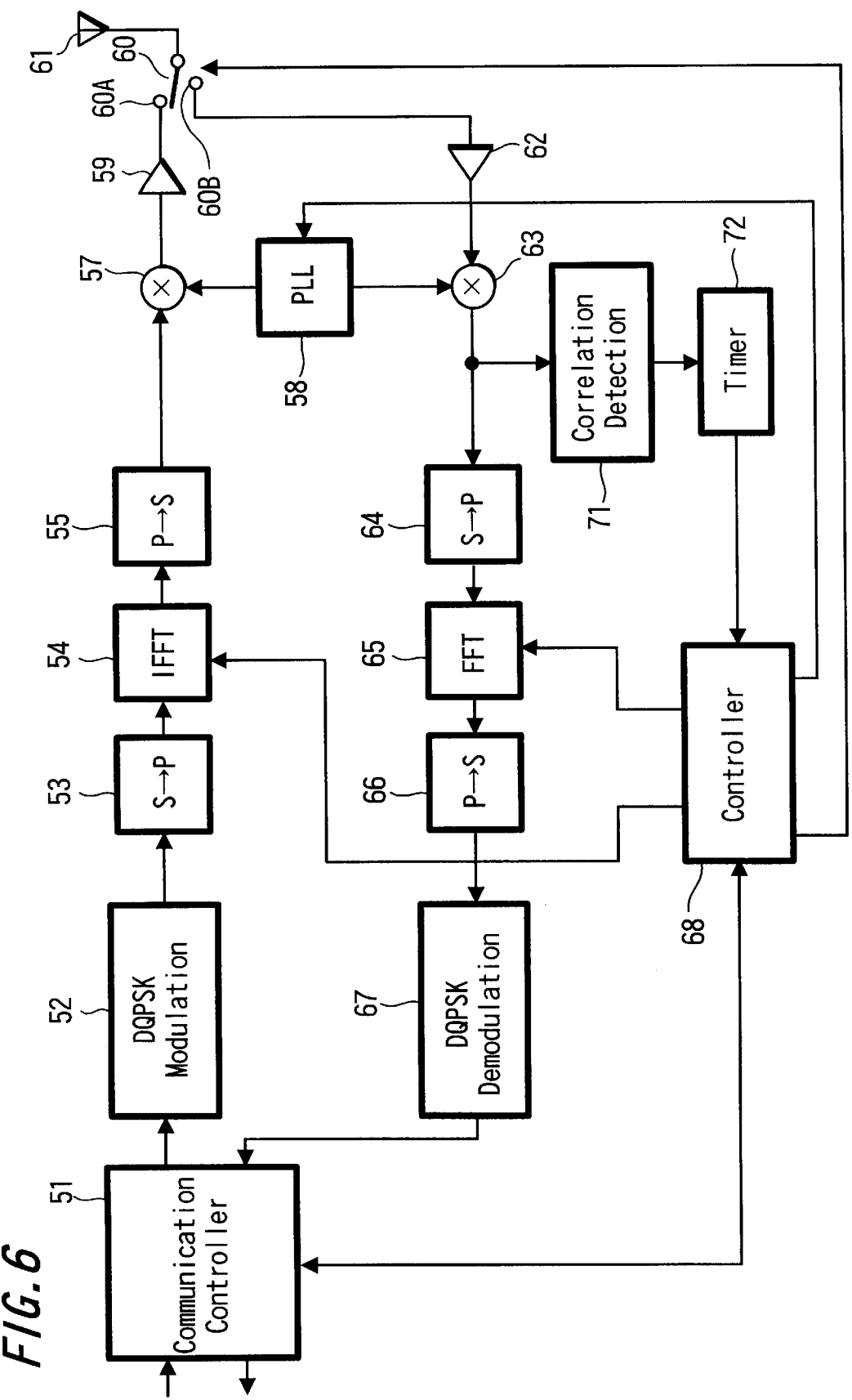
FIG. 6 is a block diagram of an example of a radio communication unit of a radio communication terminal in a radio LAN system to which an embodiment of the present invention is applied.

FIG. 6 shows configurations of the radio communication units 104A, 104B, . . . of the radio communication terminals 101A, 101B, . . . In FIG. 6, transmitted data is input through a controller 51. The data transmitted from the communication controller 51 is supplied to a DQPSK modulation circuit 52. The transmitted data is DQPSK-modulated by the DQPSK modulation circuit 52.

An output of the DQPSK modulation circuit 52 is supplied to a serial/parallel conversion circuit 53. The serial/parallel conversion circuit 53 converts serial data to parallel data. An output of the serial/parallel conversion circuit 53 is supplied to an IFFT circuit 54. The IFF circuit 54 maps transmitted data to frequency-area data, the mapped transmitted data is inverse-Fourier-transformed and converted to time-area data. An output of the IFFT circuit 54 is supplied to a parallel/serial conversion circuit 55. The serial/parallel conversion circuit 53, IFFT circuit 54, and parallel/serial conversion circuit 55 perform conversion to a multicarrier signal in accordance with the OFDM system.

An output of the parallel/serial conversion circuit 55 is supplied to a frequency conversion circuit 57. A local oscillation signal is supplied to the frequency conversion circuit 57 from a PLL synthesizer 58. A transmitted signal is converted to a predetermined frequency by the frequency conversion circuit 57.

An output of the frequency conversion circuit 57 is supplied to a power amplifier 59. The power amplifier 59 power-amplifies a transmitted signal. An output of the power amplifier 59 is supplied to a terminal 60A of the switched circuit 60. When transmitting data, the switched circuit 60 is switched to terminal-60A side. An output of the switched circuit 60 is supplied to an antenna 61.

A signal received from the antenna 61 is supplied to the switched circuit 60. When receiving data, the switched circuit 60 is switched to terminal-60B side. An output of the switched circuit 60 is amplified through a LAN 62 and then, supplied to a frequency conversion circuit 63.

A local oscillation signal is supplied to the frequency conversion circuit 63 from a PLL synthesizer 68. The received signal is converted to an intermediate-frequency signal by the frequency conversion circuit 63.

An output of the frequency conversion circuit 63 is supplied to a serial/parallel conversion circuit 64 and also supplied to a correlation detection circuit 71.

An output of the serial/parallel conversion circuit 64 is supplied to an FFT circuit 65. An output of the FFT circuit 65 is supplied to a parallel/serial conversion circuit 66. The serial/parallel conversion circuit 64, FFT circuit 65, and parallel/serial conversion circuit 66 perform OFDM-type demodulation.

An output of the parallel/serial conversion circuit 66 is supplied to a DQPSK demodulation circuit 67. The DQPSK demodulation circuit 67 performs DQPSK-type demodulation. An output of the DQPSK demodulation circuit 67 is supplied to the communication controller 51. Received data is output from an output of the communication controller 51.

The whole operation is controlled by a controller 68. The communication controller 51 controls transmission and reception of data in accordance with a command output from the controller 68.

In the case of this system, data is transmitted in accordance with the TDMA system every frame and an M-sequence code for sync acquisition is sent to one symbol at the head of one frame from the radio communication unit 105 of the radio communication control terminal 102. To realize the above control, the radio communication units 104A, 104B, . . . are provided with the correlation detection circuit 71 and a timer 72. An M-sequence sent from the radio communication unit 105 of the radio communication control terminal 102 is received by the antenna 61 at the timing of the head of a frame and sent to the correlation detection circuit 71. The transmission detection circuit 71 detects the correlation between a received code and a preset code. When it is judged that the correlation is strong, a correlation detection signal is output. An output of the correlation detection circuit 71 is sent to the timer 72. The time of the timer 72 is set in accordance with a correlation detection signal sent from the correlation detection circuit 71.

When there is data to be sent as an asynchronous packet, a transmission request is sent from the communication controller 51 in accordance with a command supplied from the controller 68. The transmission request is DQPSK-modulated by the DQPSK modulation circuit 52, inverted in accordance with OFDM, and transmitted to the radio communication control terminal 102 from the antenna 61. The transmission request is received by the radio communication control terminal 102 and control information including transmission assignment time is returned from the radio communication control terminal 102.

The control information is received by the antenna 61 and demodulated by the FFT circuit 65 in accordance with OFDM, demodulated by the DQPS demodulation circuit 67 in accordance with DQPSK, and supplied to the communication controller 51. Then, demodulated signal data is sent to the controller 68 from the communication controller 51.

The control information includes information about transmission times. These times are set on the basis of the time of the timer 72. The timer 72 is set in accordance with an output of the correlation detection circuit 71 in accordance with M-sequence timing sent from a radio communication control terminal.

When the timer 72 judges that transmission start time comes, transmission data is output from the communication controller 51 in accordance with a command sent from the controller 68 and the transmission data is DQPSK-modulated by the DQPSK conversion circuit 52, converted by the IFF circuit 54 in accordance with OFDM, and output from the antenna 61. Moreover, the timer 72 judges that reception time comes, received data is demodulated by the FFT circuit 65 in accordance with a command sent from the controller 68.

As described above, this system transmits data in accordance with OFDM by using multicarriers. As described above, because an OFDM wave is strong in jitter, the wave can be demodulated even if it is shifted by several samples. However, if the wave shifts by several samples or more and extends over two symbols, it cannot be demodulated. Therefore, it is necessary to set timing to a certain extent. Thus, in the case of this system, 147455 symbols (4 msec) are assumed as one frame so as to send data within this frame in accordance with the TDMA system and M-sequence is set to one symbol at the head of each frame so as to set demodulation timing by using the M-sequence.

When a received clock has a shift of 6.8 ppm from a received OFDM wave, a time difference of 27.2 nsec is accumulated during one frame of 4 msec. This corresponds to a sampling rate of 36.864 MHz. Therefore, by preparing a clock having an accuracy about 6.8 ppm, demodulation can be securely performed.

As a symbol for sync, it is possible to use a gold code, barker code, or bulk code obtained by adding an M-sequence and two types of M-sequences having the same cycle.

Figure 7:
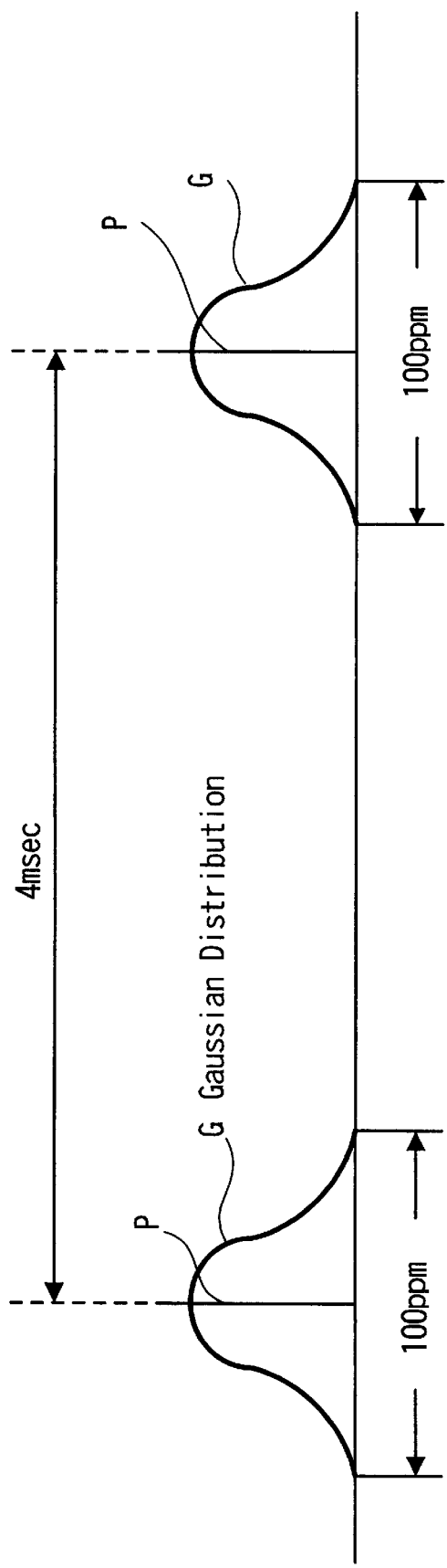
FIG. 7 is a timing diagram showing a frame cycle error generated in an embodiment of the present invention.

Actually, in the case of a radio LAN system, a signal transmitted from the radio control communication terminal 102 may be transmitted by relaying it by another terminal. When relaying the signal in a plurality of stages, the above-described time difference is accumulated and a frame-cycle error may be further increased. FIG. 7 is an illustration showing a state in which a frame-cycle error occurs. This example shows a state in which the Gaussian distribution g of the sync signal expands in a range of 100 ppm when an M-sequential sync signal p is transmitted every 4 msec of one frame cycle. In the case of each communication terminal of this embodiment, it is possible to prevent communication timing from shifting due to the above large frame-cycle error. Hereafter, the configuration and processing of each communication terminal are described.

Figure 8:
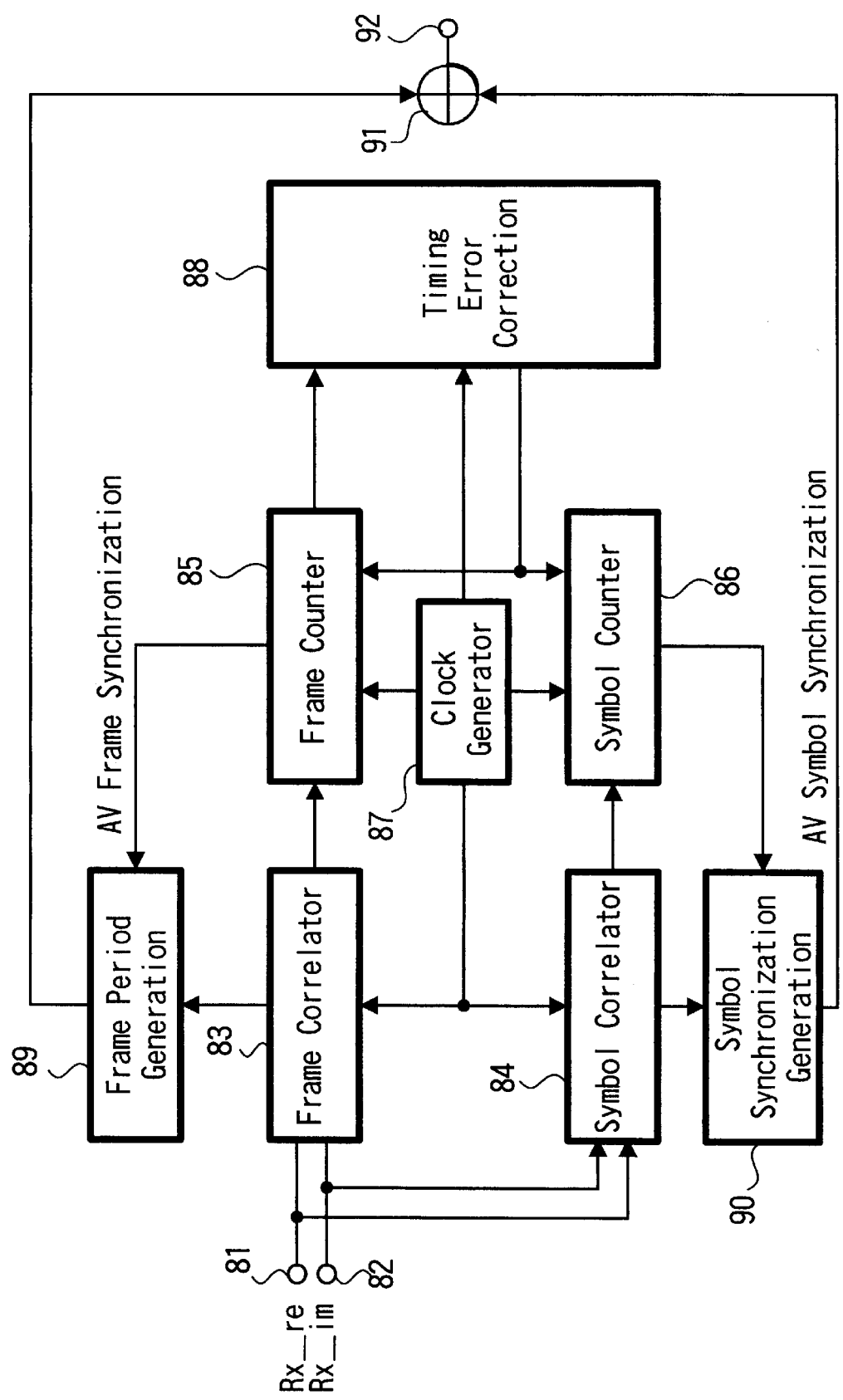
FIG. 8 is a block diagram showing an example of configuration for performing sync detection processing by a radio communication terminal of an embodiment of the present invention.

FIG. 8 shows the radio communication terminals 101A, 101B, . . . of this embodiment, which is a block diagram of a configuration for detecting M-sequence data as a sync signal transmitted from the radio control communication terminal 102 or the like. The sync processing configuration corresponds to the configuration of the correlation detection circuit 71 described for FIG. 6.

The sync-processing configuration supplies real- and imaginary-part signals obtained by received-signal input terminals 81 and 82 to a frame correlator 83 and a symbol correlator 84 to perform the correlation processing between PN code for frame sync prepared at terminal side and a received signal and the correlation processing between a PN code for symbol detection and a received signal.

Figure 9:
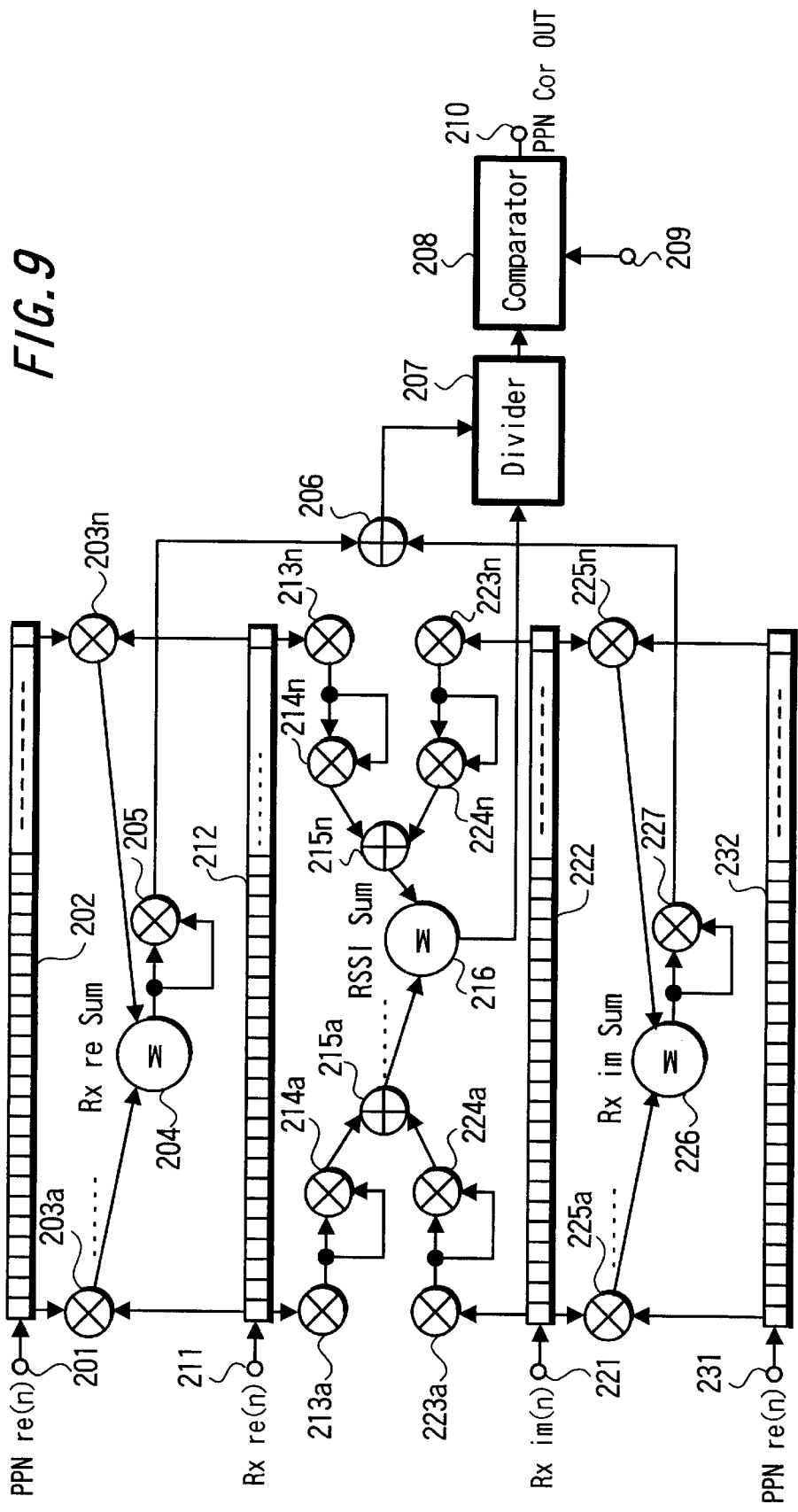
FIG. 9 is a block diagram showing an example of configuration of a frame correlator of a radio communication terminal of an embodiment of the present invention.

FIG. 9 is an illustration showing a configuration of the frame correlator 83 which supplies the real part of a PN code for frame sync prepared at terminal side and obtained by an input terminal 201 to a shift register 202. Moreover, the correlator 83 supplies the real part of a received signal obtained by an input terminal 211 to a shift register 212. Then, the correlator 83 individually multiplies the data set to each stage of both the shift registers 202 and 212 which is individually multiplied by the multipliers 203a, 203b, . . . , and 203n prepared by the number of stages of the shift registers and integrates values multiplied by the multipliers 203a to 203n by an integrator 204 to obtain a real-part correlation value Rx re Sum. Then, the correlator 83 squares the real-part correlation value Rx re Sum by a squaring circuit 205 to supply the square value to an adder 206.

Moreover, the correlator 83 supplies the imaginary part of a PN code for frame sync prepared at terminal side and obtained by an input terminal 231 to a shift register 232. Furthermore, the correlator 83 supplies the imaginary part of a received signal obtained by an input terminal 221 to a shift register 222. Then, the correlator 83 individually multiplies the data set to each stage of the both shift registers 222 and 232 by multipliers 225a, 225b, . . . , and 225n prepared by the number of stages of the shift registers and integrates values multiplied by the multipliers 225a, 225b, . . . , 225n by an integrator 226 to obtain an imaginary-part correlation value Rx im Sum. Then, the correlator 83 squares the imaginary-part correlation value Rx im Sum by a squaring circuit 227 to supply the squared value to the adder 206. PN codes for frame sync obtained by the input terminals 201 and 231 are previously prepared in storage means in terminals and are the same data as PN codes (M-sequence data) for frame sync transmitted from a control terminal or the like. Moreover, operations of each shift register are performed synchronously with clocks supplied from the clock generator 87 shown in FIG. 8.

The adder 206 adds supplied correlation values of a real part and an imaginary part to obtain a correlation value Sum Store of a received signal. The correlation value Sum Store obtained by the adder 206 is supplied to a divider 207.

Moreover, the adder 206 supplies the received data of a real part set to each stage of the shift register 212 to adders 215a to 215n through multipliers 223a to 223n and squaring circuits 224a to 224n and supplies received data of the imaginary part set to each stage of the shift register 222 to adders 215a to 215n through multipliers 223a to 223n to add receive data of the real part with that of the imaginary part. Then, the adder 206 supplies the received data added by the adders 215a to 215n to an integrator 216 and integrates the data to obtain a received power RSSI Sum. The received power RSSI Sum obtained by the integrator 216 is supplied to the divider 207.

The divider 207 divides the received-signal correlation value Sum Store by the received power RSSI Sum to obtain the quotient Corl(n). That is, the divider 207 obtains the Corl(n) in accordance with the following expression.

$$\text{Corl}(n) = \text{Sum Store}/\text{RSSI Sum} \qquad \text{[Numerical Formula 1]}$$

The value Corl(n) obtained from the above expression is supplied to a comparator 208, previously set and stored in a terminal, and compared with a threshold value TH obtained by a terminal 209. In this case, when Corl(n) is equal to or more than threshold value TH and the maximum value of Corl(n) is detected, data "H" is output from a terminal 210 as a frame-sync output PPN Cor OUT. Moreover, when Corl(n) is smaller than the threshold value TH, data "L" is output from the terminal 210. The frame-sync, output PPN Cor OUT is supplied to a frame counter 85 shown in FIG. 8.

Figure 10:
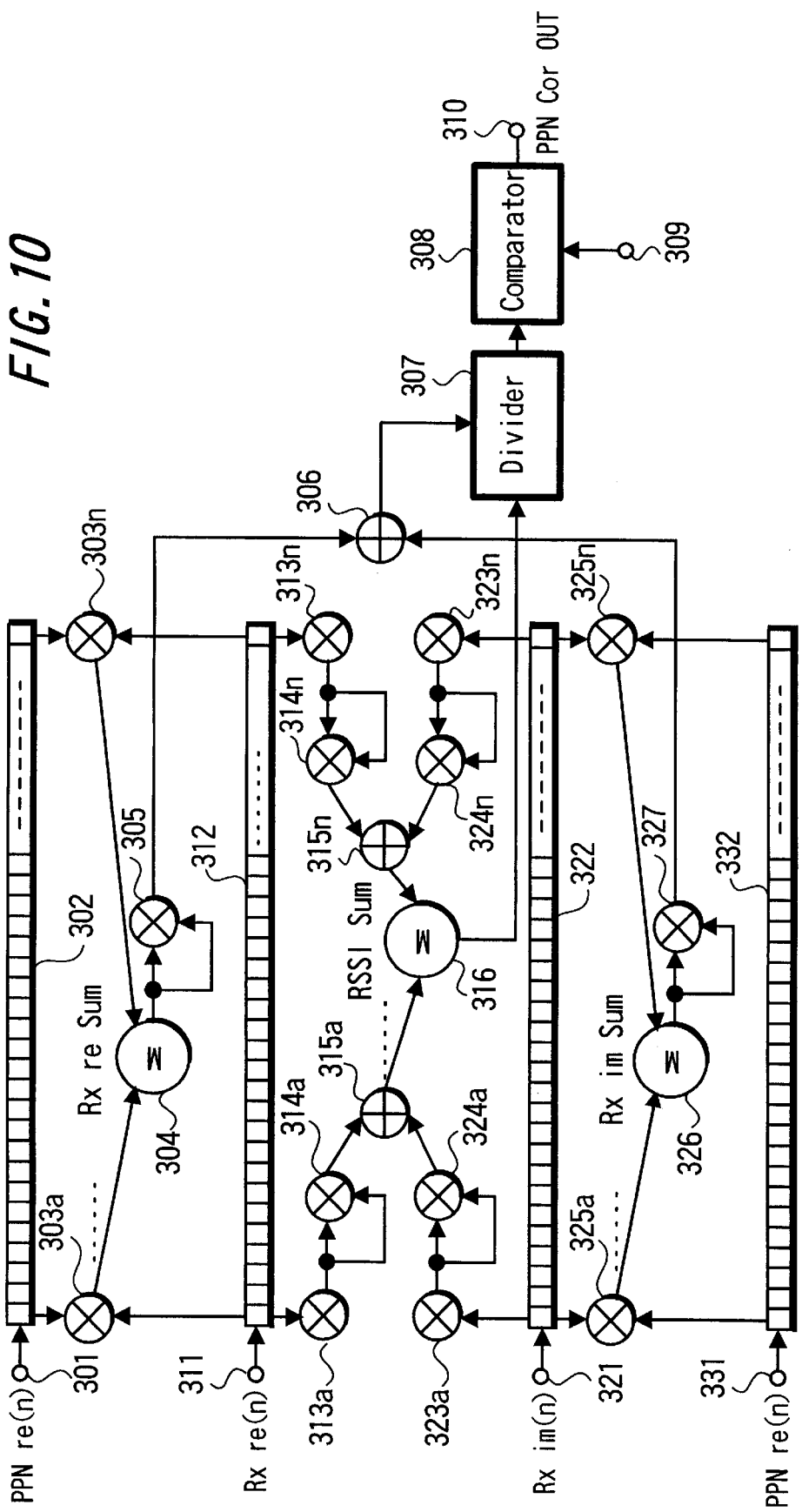
FIG. 10 is a block diagram showing an example of configuration of a symbol correlator of a radio communication terminal of an embodiment of the present invention.

Then, a configuration of the symbol correlator 84 shown in FIG. 8 is described below. FIG. 10 is an illustration showing a configuration of the symbol correlator 84 that supplies the real part of a PN code for symbol detection prepared at terminal side and obtained by an input terminal 301 to a shift register 302 and moreover, supplies the real part of a received signal obtained by an input terminal 311 to a shift register 312. Then, the correlator 84 individually multiplies the data set to each stage of the shift registers 302 and 312 by multipliers 303a, 303b, . . . , and 303n prepared by the number of stages of the shift registers and integrates values multiplied by the multipliers 303a to 303n by an integrator 304 to obtain a real-part correlation value Rx re Sum. The correlator 84 squares the real-part correlation value Rx re Sum by a squaring circuit 305 to supply the squared value to an adder 306.

Moreover, the symbol correlator 84 supplies the imaginary part of a PN code for symbol detection prepared at terminal side and obtained by an input terminal 331. Furthermore, the correlator 84 supplies the imaginary part of a received signal obtained by an input terminal 321 to a shift register 322. Then, the correlator 84 individually multiplies the data set to each stage of the shift registers 322 and 332 by multipliers 325a, 325b, . . . , and 325n prepared by the number of stages of the shift registers and integrates values multiplied by the multipliers 325a to 325n by an integrator 326 to obtain an imaginary-part correlation value Rx im Sum. Then, the correlator 84 squares the imaginary-part correlation value Rx im Sum by a squaring circuit 327 to supply the squared value to the adder 306. PN codes for symbol detection obtained by the input terminals 301 and 331 are previously prepared in the storage means of each terminal, which are the same data as PN codes (M-sequence data) for symbol detection transmitted from a control terminal or the like. Moreover, operations of each shift register are performed synchronously with clocks supplied from the clock generator 87 shown in FIG. 8.

The adder 306 adds supplied real-part and imaginary-part correlation values to obtain a received-signal correlation value Sum Store. The correlation value Sum Store obtained by the adder 306 is supplied to a divider 307.

Moreover, the adder 306 supplies real-part received data set to each stage of the shift register 312 to adders 315a to 315n through adders 313a to 313n and squaring circuits 314a to 314n and moreover supplies imaginary-part received data set to each stage of the shift register 322 to adders 315a to 315n through multipliers 323a to 323n and squaring circuits 324a to 324n to add the real-part received data and the imaginary-part received data. Then, the adder 306 supplies the received data added by the adders 315a to 315n to an integrator 316 and integrates the data to obtain received power RSSI Sum. The received power RSSI Sum obtained by the integrator 316 is supplied to the divider 307.

The divider 307 divides the received-signal correlation value Sum Store by the received power RSSI Sum to obtain the quotient Corl(n). That is, the divider 307 obtains Corl(n) through the operation same as that of the expression [Numerical Formula 1] described above. The obtained value Corl(n) is supplied to a comparator 308, previously set and stored in a terminal, and compared with a threshold value TH obtained by a terminal 309. In this case, when Corl(n) is equal to or larger than threshold value TH and the maximum value of Corl(n) is detected, data "H" is output from a terminal 310 as a symbol-detection output SPN Cor OUT. Moreover, when Corl(n) is smaller than threshold value TH, data "L" is output from the terminal 310. The symbol-detection output SPN Cor OUT is supplied to the symbol counter 86 shown in FIG. 8.

The frame counter 85 and symbol counter 86 shown in FIG. 8 are counters for counting clocks supplied from the clock generator 87 and output data for generating frame sync or symbol sync in accordance with count outputs of the counters to a frame-sync generation circuit 89 and a symbol-sync generation circuit 90. A timing-error correction section 88 is connected to the frame counter 85 and symbol counter 86. Therefore, when the data "H" is supplied from the correlators 83 and 84, the counted value at the time is supplied to the timing-error correction section 88 and moreover, the counted value is reset. Counting states of the counters 85 and 86 are controlled by the timing-error correction section 88. That is, the counters 85 and 86 are respectively provided with a mode for waiting without counting in accordance with an output of the timing-error correction section 88.

The frame-sync generation circuit 89 outputs a frame-sync pulse in accordance with an output of the frame counter 85 and an output of the frame correlator 83 and supplies the frame-sync pulse to an adder 91. Specifically, when "H" is supplied from the frame correlator 83 to the frame-sync generation circuit 89 as a frame-detection output PPN Cor OUT, the circuit 89 outputs a frame-sync pulse eight times every 72 clocks. In this case, when a frame-detection output PPN Cor OUT becomes "H"-level in a range of (15 clocks on the basis of the time when frame-sync data (hereafter referred to as AV frame-sync data) supplied from the frame counter 85 becomes "H"-level, the circuit 89 judges that the timing detected by the frame correlator 83 is effective and outputs a frame-sync signal eight times every 72 clocks on the basis of the timing when the frame-detection output PPN Cor OUT becomes "H"-level. Moreover, when the frame-detection output PPN Cor OUT is kept at "L" level in a range of ±15 clocks on the basis of the timing when an AV frame-sync pulse becomes "H"-level, the circuit 89 judges that a frame-sync timing is erroneously detected and outputs a frame-sync pulse eight times every 72 clocks at the same timing (this timing is timing set by the timing-error correction section 88 and frame counter 85) as the last frame-sync pulse.

Furthermore, the symbol-sync generation circuit 90 outputs a symbol-sync pulse in accordance with an output of the symbol counter 86 and an output of the symbol correlator 84 and supplies the symbol-sync pulse to the adder 91. Specifically, when "H" is supplied from the symbol correlator 84 to the symbol-sync generation circuit 90 as a symbol-detection output Cor OUT, the circuit 90 outputs a symbol-sync pulse every 72 clocks. In this case, only when the symbol-detection output SPN Cor OUT becomes "H"-level in a range of ±15 clocks on the basis of the time when symbol-sync data (hereafter referred to as AV symbol-sync data) supplied from the symbol counter 86 becomes "H"-level, the circuit 90 judges that the timing detected by the symbol correlator 84 is effective and outputs a symbol-sync pulse every 72 clocks on the basis of the timing when the frame-detection output PPN Cor OUT is set to "H"-level.

The adder 91 generates a sync pulse by synthesizing the both sync pulses and outputs the synthesized sync pulse to an output terminal 92. The controller 68 controls the communication timing at an output terminal 92 in accordance with a sync pulse obtained by the output terminal 92. In this case, the adder 91 controls the timing for outputting received data to the FFT 65.

Figure 11:
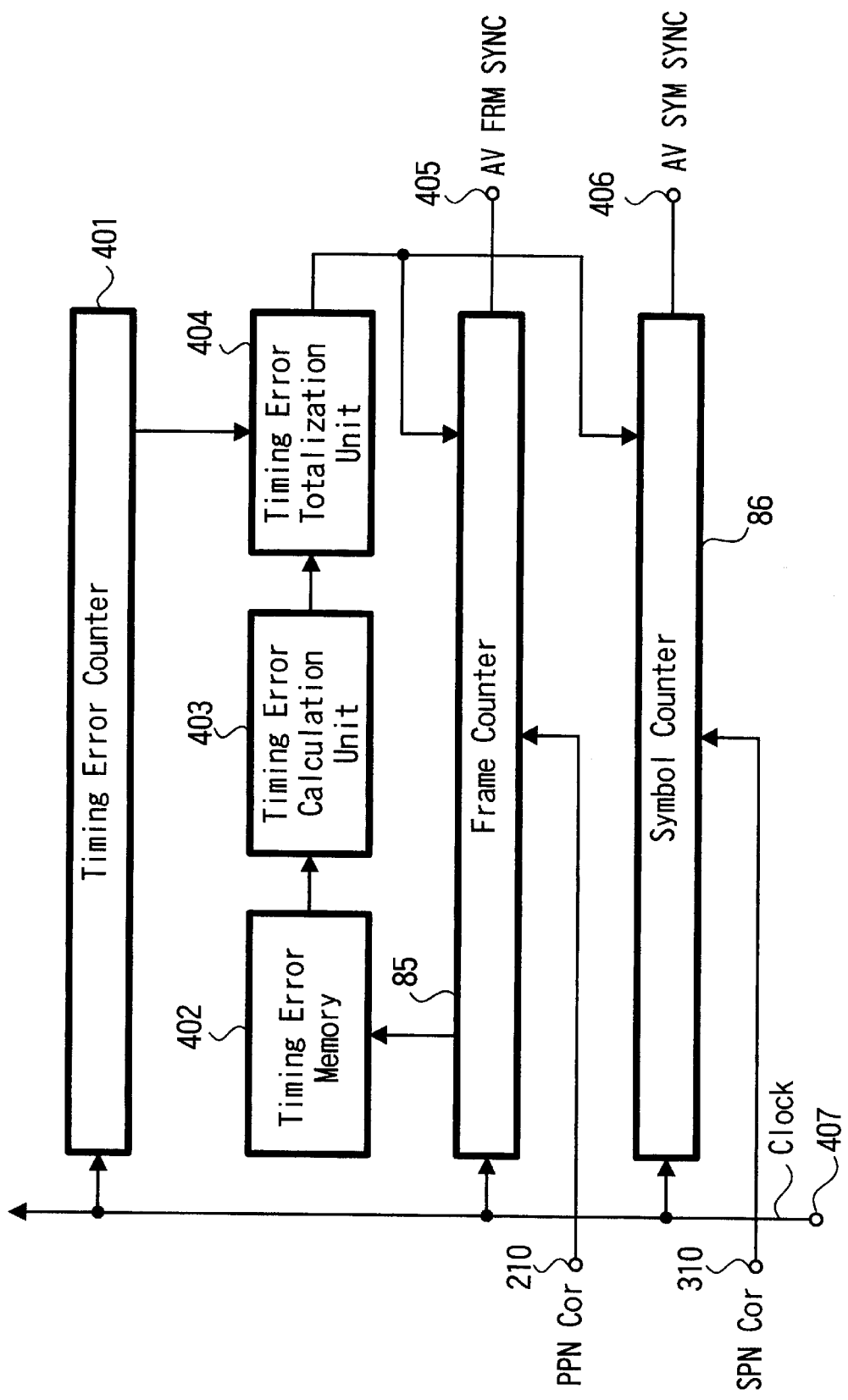
FIG. 11 is a block diagram showing an example of configuration of a timing-error correction section of an embodiment of the present invention.

FIG. 11 is an illustration showing a configuration of the timing-error correction section 88. The timing-error correction section 88 is constituted of a timing-error counter 401, a timing-error memory 402, a timing-error calculation section 403, and a timing-error totalization section 404. The timing-error counter 401 is a counter for performing counting synchronously with a clock obtained by a clock input terminal 407 and supplies a counted value to the timing-error totalization section 404. Data for a counted value supplied from the frame counter 85 is stored in the timing-error memory 402. When a detected frame cycle does not have any error, a counted value stored in the memory 402 is always the same value. Actually, counted values change correspondingly to a frame-cycle error and past predetermined frame cycles (e.g. 10 frame cycles) are stored by using the frame-cycle error as a counted value. The timing-error calculation section 403 calculates the average value of the stored frame-period errors.

The timing-error totalization section 404 controls counting states of the frame counter 85 and symbol counter 86 in accordance with frame-cycle errors calculated by the timing-error calculation section 403 to correct the frame-cycle errors. When the frame-cycle errors are corrected, the timing-error totalization section 404 supplies data "H" to the counters 85 and 86 as corrected data TEC OUT to correct sample points.

That is, a frame-cycle error is a shift (4 msec in this case) from a reference cycle generated in one frame. The shift is basically determined by the shift between the clock accuracy of a transmission-side terminal and the clock accuracy of a reception-side terminal and an error increase (or decrease) at a certain interval. Therefore, frame-sync error correction for one-to-one transmission/reception can be performed by correcting (increasing or decreasing) sample points for a received frame every certain interval.

As specific correction, a counter for correcting an error is set in the timing-error totalization section 404 so that the counter performs counting operations of 0 to 2047 cycles. Then, when a measured frame cycle is longer than a reference cycle, it is assumed that a frame cycle error Terr is equal to 3 Chip. Because a frame cycle error in the above case is equal to 3, frame-sync-error correction is executed whenever a counter in the timing-error totalization section 404 counts by 2048/3 times. That is, in the case of the above example, corrected data TEC OUT is set to H at counted values of 2048/3 (that is, 682), 4096/3 (that is, 1,364) and 2047. Because the corrected data TEC OUT is set to H at the above counted values, the frame counter 85 and symbol counter 86 respectively stop counting operation at that time.

Moreover, when a measured frame cycle and symbol cycle are shorter than a reference cycle, corrected data TEC OUT is set to L and the frame counter 85 outputs a frame-sync signal immediately when a frame-sync output PPN Cor OUT supplied to the counter 84 becomes equal to H. Moreover, the frame counter 85 outputs a symbol-sync signal immediately when a symbol-sync output SPN Cor OUT is set to H.

Furthermore, the timing-error correction section 88 of this embodiment is constituted so as to judge that a correct sync signal is detected only when a frame-sync signal detected from received signals has the timing in a set window and perform processing at the timing shown by the sync signal. The processing is described below. The timing-error totalization section 404 in the timing-error correction section 88 reflects a frame cycle error Terr supplied from the timing-error calculation section 403 on reception side. The frame cycle error is a shift from a reference cycle generated in one frame. A counted value Tdsr of a sync-signal detection counter assumed in a reception terminal is equal to 147455+Terr by assuming a reference cycle Tnrm of one frame as 147455 symbols. In this case, when a window value Twin which is a window width for detecting a sync signal is set to 15, the timing-error totalization section 404 judges that a signal is a correct frame-sync signal only when a counted value Tsync when detecting a sync signal is kept in a range of Tlow<Tsync<Tupw and controls the frame 85 and symbol counter 86. Tlow denotes a lower sync-point limit value and Tupw denotes an upper sync-point limit value.

Meaning and definition of each of the values shown above are described below.

Tsync: Counted value when detecting sync signal $$0 \rightarrow +Tmax \ (Tmax>Tnrm+Terr+Twin)$$

Tdsr: Assumed-sync-signal detection counted value $$Tdsr=Tnrm \ max+Terr$$

Twin: Window value for judging sync point
Terr: Frame cycle error $$Terr=Tsync-Tnrm$$

Tupw: Upper sync-point limit value $$Tupw=Tdsr+Twin$$

Tlow: Lower sync-point limit value $$Tlow=Tdsr-Twin$$

In this case, when a counted value at the time of detection of a frame-sync signal is larger than a reference cycle and a sync-signal detection point is out of an upper sync-point limit value (that is, for Tsync>Tupw), it is judged that Tsync is erroneously detected.

Moreover, when a counted value at the time of detection of a frame-sync signal is larger than a reference cycle and a sync-signal detection point is kept in an upper sync-point limit value (that is, for Tdsr<Tsync<Tupw), the time of detection of a sync signal is equal to Tsync.

Furthermore, when a counted value is smaller than a reference cycle at the time of detection of a sync signal and a sync-signal detection point is kept in a lower sync-point limit value (that is, for Tlow<Tsync<Tdsr), the time of detection of a sync signal is equal to Tsync.

Furthermore, when a counted value at the time of detection of a sync-signal is smaller than a reference cycle and a sync-signal detection point is out of a lower sync-point limit value (that is, for Tsync<Tlow), it is judged that Tsync is erroneously detected.

By performing the above setting, setting the sync-point-judging window value Twin on the basis of the assumed sync-signal-detection counted value Tdsr, adjusting only a sync signal detected in a range between a lower sync-point limit value and a upper sync-point limit value of the window to a correct timing, and processing sync signals out of the range as erroneous detection, a sync signal whose timing is greatly disordered is not used for sync processing.

It is also permitted to set the sync-point-judging window value Twin so that the value Twin can be changed in accordance with the control under the control section of the radio communication terminal. That is, it is also permitted to set the sync-point judging window value Twin so the width of the value Twin can be adjusted by operating an operation section (not illustrated) connected to the control section of the radio communication terminal and thereby, set the upper sync-point limit value Tupw and the lower sync-point limit value Tlow so that the values Tupw and Tlow can be changed. Thus, when an allowable range of shifts of the timing of a sync signal changes depending on a state of a network configuration of a radio LAN constituted of the radio terminal, it is possible to adjust the width of the window value Twin to a proper value. Moreover, it is permitted that the control section automatically sets the width of the window value Twin to a proper value.

Furthermore, in the case of the timing-error correction section 88 of this embodiment, when a plurality of frame-sync signals are detected in a sync-point judging window, only a first-detected sync signal is used as an effective sync signal but sync signals other than the sync signal are ignored. Thus, when relaying and transmitting a frame-sync signal transmitted from a radio communication control terminal in a radio LAN by an optional terminal, a frame-sync signal of any terminal may be received. However, even when receiving and detecting a plurality of frame-sync signals as described above, the timing according to the first frame-sync signal is set but the timing does not synchronize with a frame-sync signal whose timing is delayed and thereby, a preferable sync timing is maintained.

Figure 12:
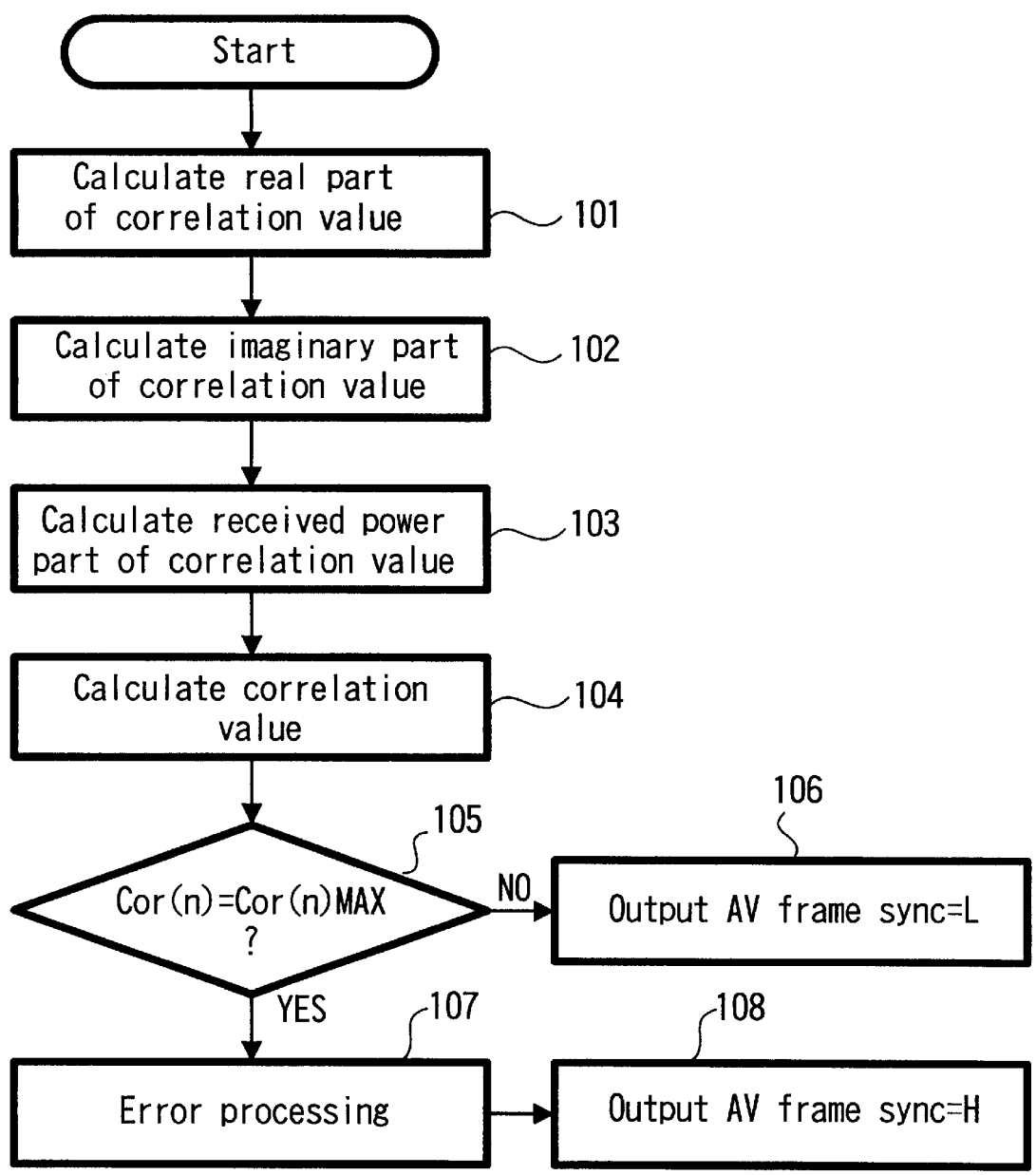
FIG. 12 is a flow chart showing frame sync processing by an embodiment of the present invention.

Then, sync processing to be executed by the circuit having the above-described configuration is described by referring to flow charts from FIG. 12 downward. First, frame-sync processing is described below by referring to the flow chart in FIG. 12. The real part of a correlation value is calculated (step 101) and also the imaginary part of the correlation value is calculated (step 102), and moreover received power (step 103) is calculated (step 103) by the frame correlator 83 to calculate a correlation value obtained by adding the real part and imaginary part (step 104). Then, it is judged whether a value Cor(n) obtained by dividing the calculated correlation value by the received power is the maximum value (step 105). When the value Cor(n) is not the maximum value, AV-frame-sync data=L is output to the frame-sync generator 89 (step 106). When it is judged in step 105 that the value Cor(n) is the maximum value, error processing is executed by judging that the state is an error state (step 107) and AV-frame-sync data=H is output to the frame-sync generator 89 (step 108).

Figure 13:
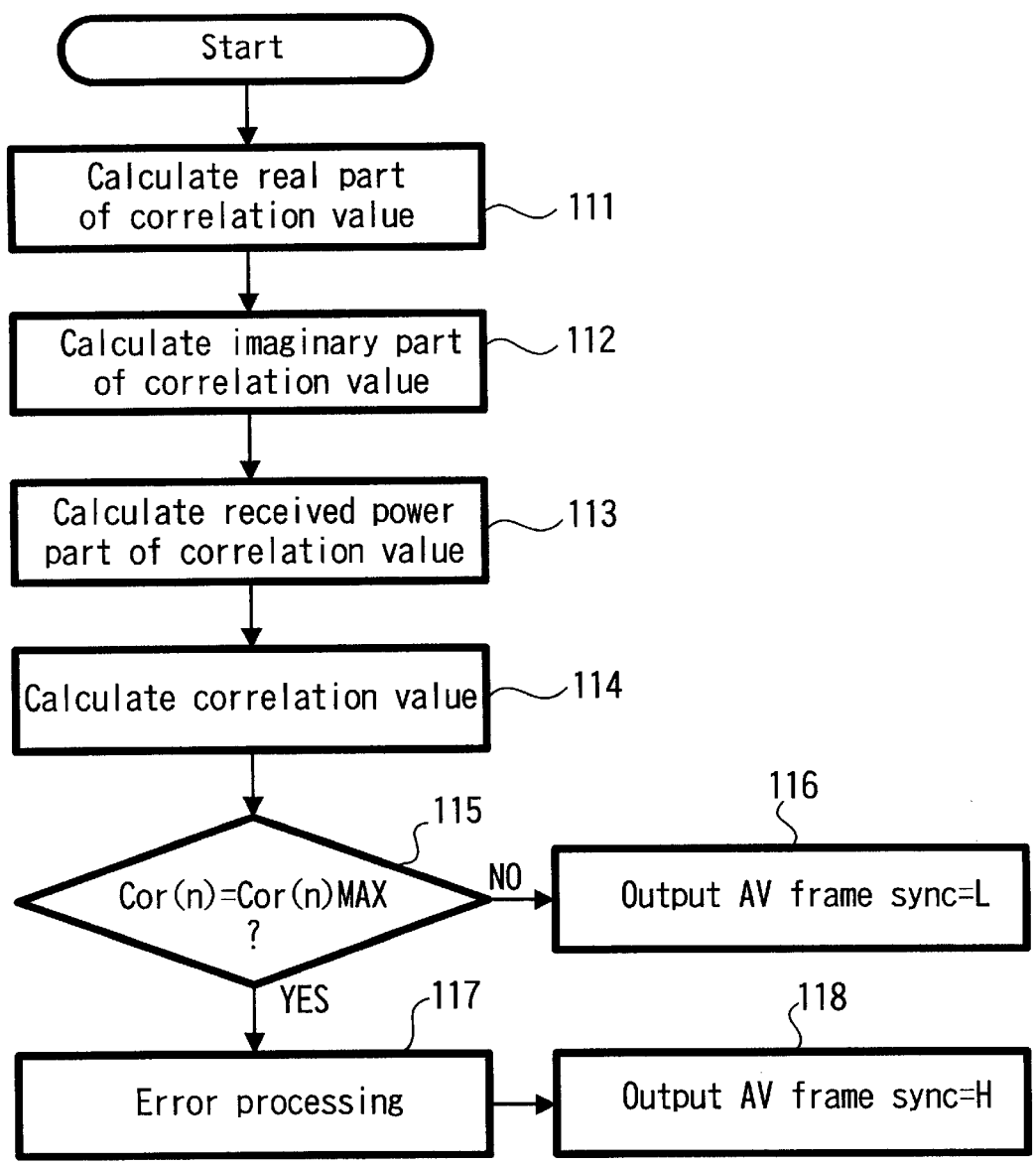
FIG. 13 is a flow chart showing symbol sync processing by an embodiment of the present invention.

Then, symbol-sync processing is described below by referring to the flow chart in FIG. 13. The real part of a correlation value is calculated (step 111) and also the imaginary part of the correlation value is calculated (step 112), and moreover received power is calculated (step 113) by the symbol correlator 84 to calculate a correlation value obtained by adding the real part and imaginary part (step 114). Then, it is judged whether a value Cor(n) obtained by dividing the calculated correlation value by the received power is the maximum value (step 115). When the value Cor(n) is not the maximum value, AV-symbol-sync data=L is output to the symbol-sync generator 90 (step 116). When it is judged in step 115 that the value Cor(n) is the maximum value, error processing is executed by judging that the state is an error state (step 117) and AV-symbol-sync data=H is output to the symbol-sync generator 90 (step 118).

Figure 14:
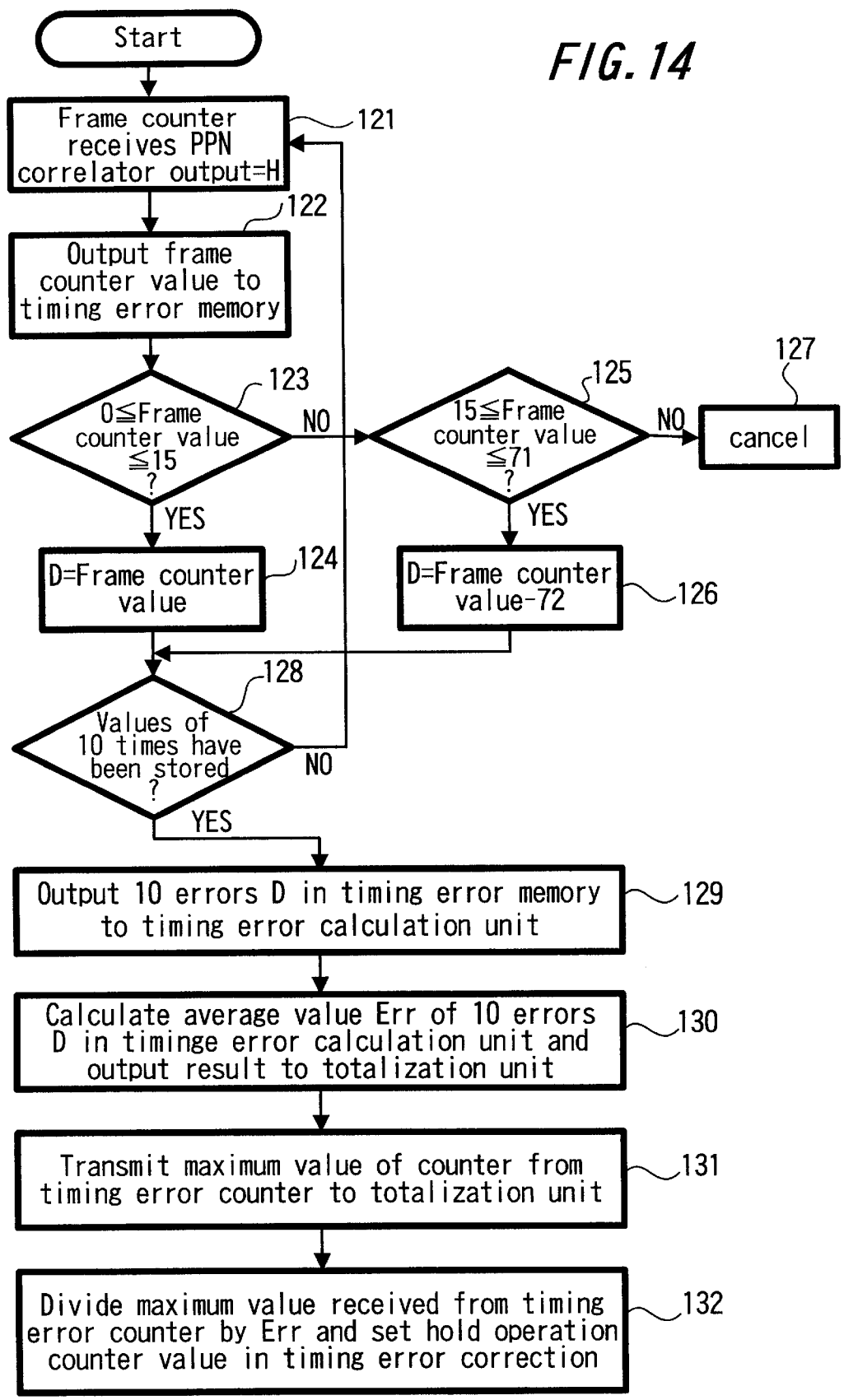
FIG. 14 is a flow chart showing hold-frequency setting processing by an embodiment of the present invention.

Then, processings by the timing-error correction section 88 are described below by referring to the flow chart in FIG. 14. First, it is judged whether "H" is received as an output of the frame correlator 83 (step 121) and a value counted by a frame counter is output to the timing-error memory 402 (step 122). In this case, it is judged whether a value $X_1$ counted by the frame counter is kept in a range of $0 \geq X_1 \geq 15$ (step 123). When the counted value $X_1$ is kept in the range, an error D is set as a counted value of the frame counter (step 124). Moreover, the counted value $X_1$ is out of the range in step 123, it is judged whether the counted value $X_1$ is kept in a range of $56 \geq X1 \geq 71$ (step 125). When the counted value $X_1$ is kept in the range, an error D is set as (counted value of the frame counter-72) (step 126). Moreover, when the counted value $X_1$ is out of the range, the then counted value is canceled (step 127).

When error values are set in steps 124 and 126, it is judged whether error values of ten times are stored in the timing-error memory 402 (step 128). When error values of ten times are not stored, step 121 is restarted. When error values of ten times are stored, ten error values D in the timing-error memory 402 are output to the timing-error calculation section 403 (step 129), the average value Err of ten error values D is calculated, and the average value Err is output to the timing-error totalization section 404 (step 130). Moreover, data for the maximum value of counted values is sent from the timing-error counter 401 to the timing-error totalization section 404 (step 131). The timing-error totalization section 404 divides the maximum value received from the timing-error counter 401 by the average value Err of error values D and sets a counted value for hold operation to the timing-error correction section (step 132).

Figure 15:
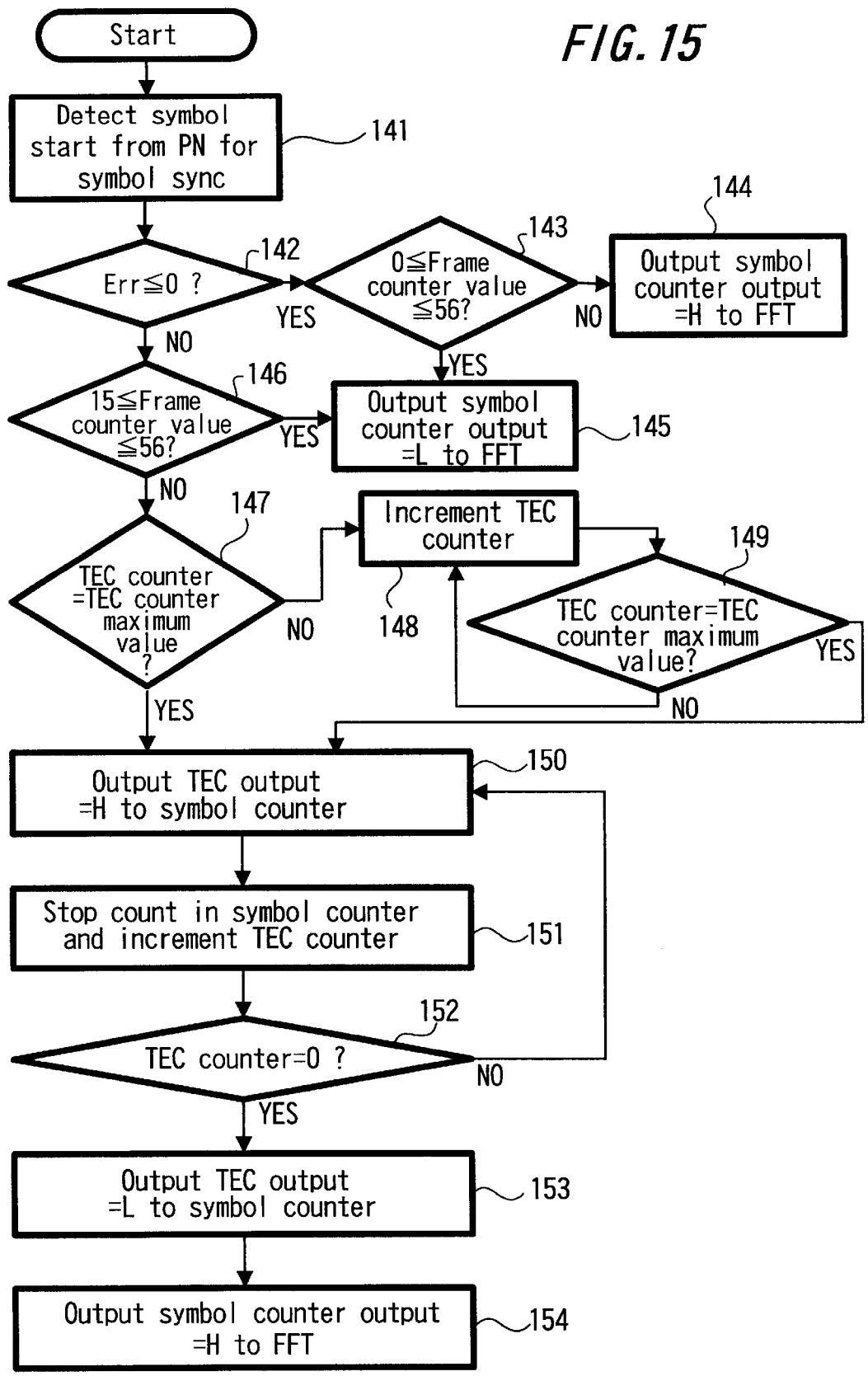
FIG. 15 is a flow chart showing a symbol-counter output pattern by an embodiment of the present invention.

Then, an output pattern of the symbol counter 86 is described below by referring to the flow chart in FIG. 15. First, when symbol start is detected in accordance with the data sent from the symbol correlator 84 (step 141), it is judged whether the average value Err of error values D is equal to or smaller than 0 (step 142). When the average value Err is equal to or smaller than 0, it is judged whether a counted value $X_1$ of the frame counter 85 is kept in a range of $0 \geq X_1 \geq 56$ (step 143). In this case, it is judged that the counted value $X_1$ is out of the range and a symbol counter output=H is output (step 144).

When it is judged in step 143 that the counted value $X_1$ is kept in the range, a symbol counter output=L is output (step 145). However, when it is judged in step 142 that the average value Err is not equal to or smaller than 0, it is judged whether the counted value $X_1$ of the frame counter 85 is kept in a range of $15 \geq X_1 \geq 56$ (step 146). When the value $X_1$ is kept in the range, step 145 is started to output a symbol counter output=L.

When it is judged in step 146 that the counted value $X_1$ of the frame counter 85 is not kept in the range of $15 \geq X_1 \geq 56$, it is judged whether the counted value of the counter 401 set in the timing-error correction section 88 is the maximum value (step 147). When the counted value is not the maximum value, the counted value of the counter 401 is incremented (step 148) to judge whether the counted value of the counter 401 is the maximum value (step 149), and incrementing of a counted value is repeated until the counted value is judged as the maximum value.

When it is judged in step 147 or 149 that the counted value is the maximum value, "H" is supplied to the symbol counter 86 as an output of the timing-error correction section 88 (step 150). Then, counting by the symbol counter 86 is stopped to make the timing-error counter 401 increment data (step 151). Then, it is judged whether a counted value of the timing-error counter 401 is equal to 0 (step 152). When the counted value is not equal to 0, step 150 is restarted.

When the counted value is equal to 0 in step 152, "L" is supplied to the symbol counter 86 as an output of the timing-error correction section 88 (step 153). Then, output of the symbol counter 86 is set to "H" (step 154).

Figure 16:
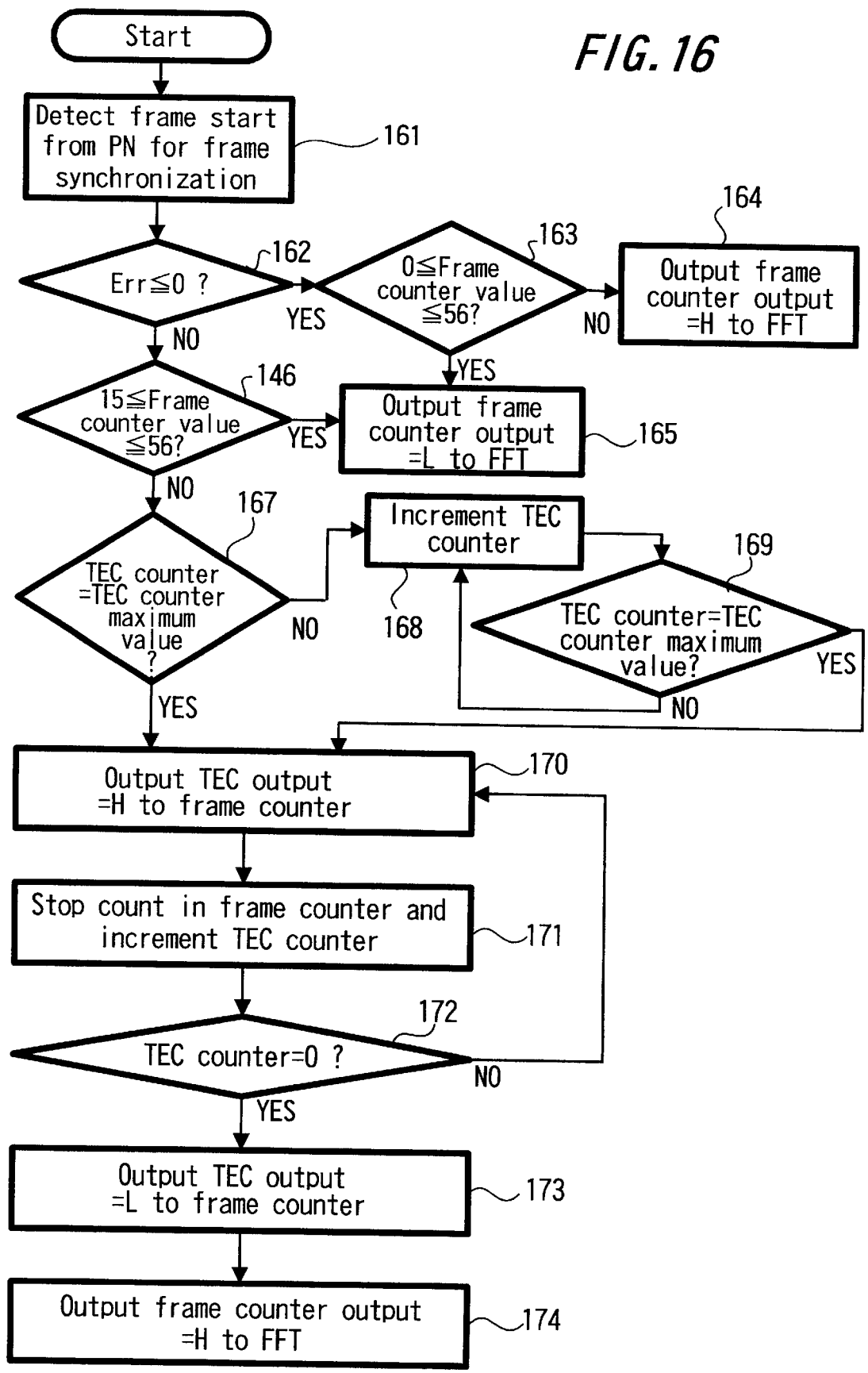
FIG. 16 is a flow chart showing a frame-counter output pattern by an embodiment of the present invention.

Then, an output pattern of the frame counter 85 is described below by referring to the flow chart in FIG. 16. First, when frame start is detected in accordance with the data sent from the frame correlator 83 (step 161), it is judged whether the average value Err of error values D set by the timing-error correction section 88 is equal to or smaller than 0 (step 162). When the average value Err is equal to or smaller than 0, it is judged whether a counted value $X_1$ of the frame counter 85 is kept in a range of $0 \geq X_1 \geq 56$ (step 163). In this case, when it is judged that the counted value $X_1$ is out of the range, a frame counter output=H is output (step 164).

When it is judged in step 163 that the counted value $X_1$ is kept in the range, a frame counter output=L is output (step 165). Moreover, it is judged in step 162 that the average value Err is not equal to or smaller than 0, it is judged whether the counted value $X_1$ of the frame counter 85 is kept in a range of $15 \geq X_1 \geq 56$ (step 166). When the counted value $X_1$ is kept in the range, step 165 is started to output a symbol counter output=L.

When it is judged in step 166 that the counted value $X_1$ of the frame counter 85 is not kept in the range of $15 \geq X_1 \geq 56$, it is judged whether the counted value of the counter 401 set in the timing-error correction section 88 is the maximum value (step 167). In this case, when the counted value is not the maximum value, a counted value of the counter 401 is incremented (step 168) to judge whether the counted value of the counter 401 is the maximum value (step 169) and incrementing of a counted value is repeated until the counted value is judged as the maximum value.

When it is judged in step 167 or 169 that the counted value is the maximum value, "H" is supplied to the frame counter 85 as an output of the timing-error correction section 88 (step 170). Then, counting by the frame counter 85 is stopped to make the timing-error counter 401 increment data (step 171). Then, it is judged whether a counted value of the timing-error counter 401 is equal to 0 (step 172). When the counted value is not equal to 0, step 170 is restarted.

When the counted value is equal to 0 in step 172, "L" is supplied to the frame counter 85 as an output of the timing-error correction section 88 (step 173). Then, an output of the frame counter 85 is set to "H" (step 174).

FIG. 17 shows an example of actual outputs. It is assumed that an output of the frame correlator 83 is in the state shown by A in FIG. 17, an output of the symbol correlator 84 is in the state shown by B in FIG. 17, an AV frame-sync pulse output from the frame counter 85 is in the state shown by D in FIG. 17, and an AV symbol-sync pulse output from the symbol counter 86 is in the state shown by E in FIG. 17. In this case, frame-sync pulses output from the frame-sync generator 89 form a string of eight pulses in one cycle at the timing frame set in accordance with correlation detection as shown by E in FIG. 17. Moreover, a symbol-sync pulse output from the symbol-sync generator 90 has the timing set in accordance with symbol correlation detection as shown by F in FIG. 17. However, when an error is detected in an AV symbol-sync pulse, a pulse (shown by symbol x in FIG. 17) at the timing in which the error is detected is not output. Therefore, pulses output from the terminal 92 form a pulse string shown by G in FIG. 17.

Table 1 shows a true value table of processings by the circuit of this embodiment.

TABLE 1

| Frame correlator output | Symbol correlator output | TEC output | Frame counter output | Symbol counter output | Frame counter value | Symbol counter value |
|---|---|---|---|---|---|---|
| H | H | H | L | L | N/A | N/A |
| H | H | L | L | L | N/A | N/A |
| H | L | H | L | L | 0 → 14 | N/A |
| H | L | L | H | L | (0 → 14) or (57 → 71) | N/A |
| H | L | L | L | L | 15 → 56 | N/A |
| L | H | H | L | L | N/A | 0 → 14 |
| L | H | L | L | H | N/A | (0 → 14) or (57 → 71) |
| L | H | L | L | L | N/A | 15 → 56 |
| L | L | H | L | L | N/A | N/A |
| L | L | L | L | L | N/A | N/A |

As shown in Table 1, an output of the timing-error correction section 88 set to "H" corresponds to a case of performing erroneous detection and an output of the section 88 set to "L" corresponds to a case of performing correct detection.

Thus, by performing acquisition processing by a terminal unit of this embodiment, it is possible to prevent a shift of the timing for receiving and relaying a sync signal transmitted from the radio communication control terminal 102 by any radio communication terminal. Even when relaying is performed at a plurality of stages, it is possible to prevent a shift of sync timing. Specifically, a shift between a clock of a terminal at sync-signal transmission side and a clock of a terminal at sync-signal reception side is correctly compensated, a sync signal constituted of M-sequence data is generated at a certain correct cycle even if temporarily failing in reception of the sync signal, reception and transmission processings are performed in accordance with the generated sync signal, and the sync signal generated according to necessity is transmitted to other terminal to which the signal is relayed from the above terminal.

Figure 18:
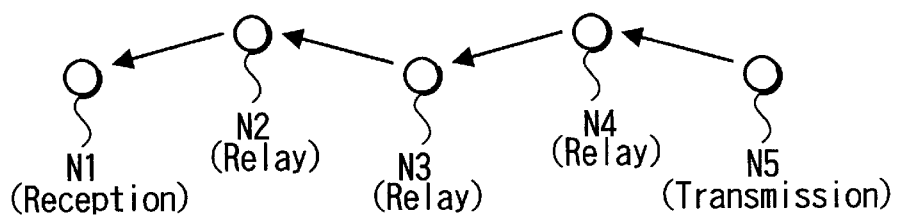
FIG. 18 is an explanatory illustration showing an example of transmission state by an embodiment of the present invention.

For example, as shown in FIG. 18, when assuming a case in which five terminals of nodes N1 to N5 are almost linearly arranged in a network and relaying through the nodes N4, N3, and N2 is necessary, it is possible to minimize a shift of timing of a sync signal or the like to be retransmitted from the relaying nodes N2 to N4 and thereby, an error that timing is shifted every relaying is not accumulated. Therefore, communication in a radio LAN is correctly performed with no shift of sync timing and it is possible to minimize the number of transmission errors due to a shift of sync timing and efficiently use a prepared transmission band.

The above-described sync acquisition processing is not restricted to terminal units for a radio LAN system described for FIGS. 1 to 6. It is a matter of course that the sync acquisition processing can be applied to radio communication terminals for various communication systems requiring the similar sync acquisition processing.

In the case of the above-described embodiment, data values of predetermined times are simply averaged to judge a past sync-signal detection cycle. However, it is also permitted to detect an average cycle by performing any weighting.

According to the sync signal detection method of the present invention, it is possible to perform sync processing by using a cyclically-set detection window and thereby using only a sync signal transmitted in a certain range and minimizing a shift of sync timing because, even if a sync-signal transmission timing is temporarily greatly delayed due to relay processing, sync processing according to the sync signal at the delayed timing is not performed. For example, by transmitting a received sync signal at the timing synchronizing with the sync signal and applying the sync signal to a terminal for relaying, it is possible to prevent disturbance of sync from accumulating in a radio network.

According to the sync signal detection method of the present invention, because a cycle at which a sync signal is detected is judged by averaging cycles at which a predetermined number of past sync signals are detected, it is possible to accurately estimate sync timing in accordance with a past reception state.

According to the sync signal detection method of the present invention, because a width of a detection window can be set to any value through a predetermined operation, it is possible to set a proper window width to perform processing correspondingly to a radio LAN system to which the detection method is applied.

According to the sync signal detection method of the present invention, because when a plurality of sync signals are detected in a detection window, only a first-detected sync signal is regarded as a correct sync signal and other sync signals are ignored, a sync signal delayed because the processing for relaying the signal is performed in a radio LAN system is ignored and the timing using only a sync signal to be first transmitted is set.

According to the radio communication system of the present invention, only a sync signal detected by sync detection means in a sync detection window set by sync control means is judged as a correct-timing sync signal and sync processing is performed by using only the correct-timing sync signal. Therefore, if a shift of timing occurs in a sync signal to be transmitted due to any factor, sync timing according to the timing-shifted sync signal is not set but communication minimizing a shift of sync timing is realized.

According to the radio communication system of the present invention, because a cycle at which a sync signal is detected by cycle judgment means is judged by judging the average of cycles at which a predetermined number of past sync signals are detected, a radio communication system can be obtained to which sync timing can be accurately set in accordance with a past reception state.

According to the radio communication system of the present invention, because a width of a sync detection window set by sync control means can be set to any value through a predetermined operation, it is possible to set a window width suitable for a radio LAN constructed by the radio communication system and a radio communication system capable of performing optimum sync detection in a LAN having any system configuration.

According to the radio communication system of the present invention, because when sync detection means detects a plurality of sync signals in a sync detection window set by sync control means, the sync control means regards only a first-detected sync signal as a correct sync signal and ignores other sync signals, when the processing for relaying a sync signal is performed in a radio LAN system to which the radio communication system belongs, a sync signal delayed and transmitted because the signal is relayed is ignored and the timing using only a sync signal to be first transmitted is set and thereby, it is possible to obtain a radio communication system capable of minimizing the disturbance of sync timing.

What is claimed is:

1. A sync signal detection method for receiving a sync signal regularly radio-transmitted from a predetermined station at a predetermined cycle and detecting the received sync signal, comprising the steps of:

judging a cycle at which the sync signal is detected;

setting a detection window to have a predetermined fixed width at every judged cycle; and judging only the sync signal detected in the detection window as an effective sync signal, wherein a cycle where the sync signal is detected is judged with an average of cycles at which the sync signals were detected a predetermined number of times in the past.

2. The sync signal detection method according to claim 1, wherein a width of the detection window can be set to an arbitrary value with a predetermined corresponding operation.

3. A sync single detection method for receiving a sync signal regularly radio-transmitted from a predetermined station at a predetermined cycle and detecting the received sync signal, comprising the steps of:

judging a cycle at which the sync signal is detected;

setting a detection window to have a predetermined fixed width at every judged cycle; and judging only the sync signal detected in the detection window as an effective sync signal, wherein when a plurality of sync signals are detected in the detection window, only a first-detected sync signal is considered as a correct sync signal and other sync signals are ignored.

4. A radio communication system comprising:

reception means for receiving a radio signal;

sync detection means for detecting a sync signal out of radio signals received by the reception means;

cycle judgement means for judging a cycle at which the sync signal is detected by the sync detection means; and sync control means for setting a fixed width sync detection window at a cycle judged by the cycle judgement means and for judging only the sync signal detected by the sync detection means in a range in which the fixed width sync detection window is set as an effective sync signal, wherein a cycle at which a sync signal is detected by the cycle judging means is judged with an average of cycles at which sync signals were detected a predetermined number of times in the past.

5. The radio communication systems according to claim 4, wherein a width of the sync detection window set by the sync control means can be set to an arbitrary value with a predetermined corresponding operation.

6. A radio communication system comprising:

reception means for receiving a radio signal;

sync detection means for detecting a sync signal out of radio signals received by the reception means;

cycle judgement means for judging a cycle at which the sync signal is detected by the sync detection means; and sync control means for setting a fixed width sync detection window at a cycle judged by the cycle judgement means and for judging only the sync signal detected by the sync detection means in a range in which the fixed width sync detection window is set as an effective sync signal, wherein when the sync detection means detects a plurality of sync signals in the sync detection window set by the sync control means, the sync control means regards only a first-detected sync signal as a correct sync signal and ignores other sync signals.

* * * * *